United States Patent
Obuchi et al.

(10) Patent No.: US 8,320,946 B2
(45) Date of Patent: Nov. 27, 2012

(54) MOBILE USER TERMINAL, MOBILE COMMUNICATION SYSTEM, BASE STATION, AND COMMUNICATION METHOD

(75) Inventors: Kazuhisa Obuchi, Kawasaki (JP); Tetsuya Yano, Kawasaki (JP); Shunji Miyazaki, Kawasaki (JP); Takao Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/478,617

(22) Filed: May 23, 2012

(65) Prior Publication Data

US 2012/0230321 A1    Sep. 13, 2012

Related U.S. Application Data

(63) Continuation of application No. 13/172,239, filed on Jun. 29, 2011, which is a continuation of application No. 11/892,611, filed on Aug. 24, 2007, now Pat. No. 8,064,937.

(30) Foreign Application Priority Data

Sep. 20, 2006   (JP) ................... 2006-254525

(51) Int. Cl.
H04Q 7/32 (2006.01)
(52) U.S. Cl. .......... 455/502; 455/67.11; 455/522; 455/69; 455/423; 455/425; 370/310; 370/328; 370/329; 370/343; 370/345
(58) Field of Classification Search .......... 455/502, 455/500, 517, 522, 69, 68, 67.11, 423–425, 455/509, 452.1, 422.1, 403, 550.1; 370/310, 370/328, 329, 343, 345, 350, 480, 503, 510, 370/512
See application file for complete search history.

(56) References Cited

U.S. PATENT DOCUMENTS

| | | | |
|---|---|---|---|
| 7,529,553 B2 * | 5/2009 | Koyanagi | ..................... 455/457 |
| 2003/0096630 A1 | 5/2003 | Dartois | |
| 2003/0117969 A1 | 6/2003 | Koo et al. | |
| 2004/0203980 A1 | 10/2004 | Das et al. | |
| 2005/0059356 A1 | 3/2005 | Lee et al. | |
| 2005/0099939 A1 | 5/2005 | Huh et al. | |
| 2005/0201328 A1 | 9/2005 | Moon et al. | |
| 2006/0146856 A1 | 7/2006 | Jung et al. | |
| 2011/0305261 A1 | 12/2011 | Nishio | |

FOREIGN PATENT DOCUMENTS

CN            1422003        6/2003
(Continued)

OTHER PUBLICATIONS

"Notice of Reasons for Rejection" issued by the Japanese Patent Office for corresponding Japanese Patent Application No. 2010-113848, drafted May 27, 2012. Partial English translation attached.

(Continued)

Primary Examiner — Keith Ferguson
(74) Attorney, Agent, or Firm — Myers Wolin, LLC

(57) ABSTRACT

A mobile user terminal includes a receiver which receives a signal, and a processor which measures downlink channel quality based on the signal and does not transmit downlink channel quality information and an uplink pilot signal simultaneously at a period which the mobile user terminal is a state of transmission off in an intermittent fashion.

1 Claim, 19 Drawing Sheets

FOREIGN PATENT DOCUMENTS

| | | |
|---|---|---|
| CN | 1655477 | 8/2005 |
| EP | 1313232 | 5/2003 |
| EP | 1 351 411 | 10/2003 |
| EP | 1 677 478 | 7/2006 |
| JP | 2000-510675 | 8/2000 |
| JP | 2003-318821 | 11/2003 |
| JP | 2005-27107 | 1/2005 |
| JP | 2005-500759 | 1/2005 |
| JP | 2005-99017 | 4/2005 |
| WO | 99/38278 | 7/1999 |
| WO | 03/010984 | 2/2003 |
| WO | 03/017688 | 2/2003 |
| WO | 2005/072073 | 8/2005 |
| WO | 2006/105308 | 10/2006 |
| WO | 2006/127340 | 11/2006 |

OTHER PUBLICATIONS

3GPP TR 25.813 V7.0.0 (Jun. 2006); 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7); dated Jun. 2006.

3GPP TR 25.814 V7.0.0 (Jun. 2006); 3rd Generation Partnership Project; Technical Specification Group Radio Access Network; Physical layer aspects for evolved Universal Terrestrial Radio Access (UTRA) (Release 7); dated Jun. 2006.

Korean Patent Office Action with partial English translation [p. 2, line 6 to p. 3, line 13] for corresponding Japanese Patent Application No. 10-2007-93724; Issued May 28, 2009 for submission Jul. 28, 2009.

The State Intellectual Property Office of China, "Office Action" for corresponding Chinese Patent Application No. 200710153347.X, issued Mar. 11, 2010. English translation attached.

Japanese Patent Office "Notice of Reasons for Rejection" issued for corresponding Japanese Patent Application No. 2006-254525, mailed May 10, 2011. English translation attached.

Japanese Patent Office "Notice Of Reasons For Rejection" issued for corresponding Japanese Patent Application No. 2006-254525, mailed Aug. 9, 2011. English translation attached.

Notice of Reasons for Rejection with partial English translation issued for corresponding Japanese Patent Application No. 2010-113848 mailed Apr. 3, 2012.

Partial European Search Report with Written Opinion, issued for corresponding European Patent Application No. 07114922, mailed Jul. 1, 2011.

Extended European Search Report with Annex, issued for corresponding European Patent Aplication No. 10164651, mailed Jul. 1, 2011.

Interdigital; "Scheduling and Multiplexing of CQI and ACK/NACK Feedback for Single Carrier FDMA in Evolved UTRA Uplink" 3GPP Draft; R1-060155, 3rd Generation Partnership Project (3GPP); TSG-RAN WG1 LTE Ad Hoc Meeting, Helsinki, Finland Jan. 23-25, 2006 [Ref.; EESR mailed Jul. 1, 2011].

3GPP TR 25.814 V1.5.0; 3rd Generation Partnership Project; Technical Specification Group Radio Access Network; Physical Layer Aspects Evolved UTRA (Release 7); Internet Citation, May 27, 2006; pp. 1-125; XP002574055; [Ref.; Partial ESR mailed Jul. 1, 2011].

Extended European search report and the European search opinion issued for corresponding European Patent Application No. 121726648.3 dated Aug. 20, 2012.

Lucent Technologies; "Energy requirements for UL HS-DPCCH signaling with and without special pilot bits"; Agenda Item: AH32, HSDPA; 3GPP TSG-RAN WG1#24; R1-020421; Orlando, USA (FL); Feb. 18-22, 2002.

* cited by examiner

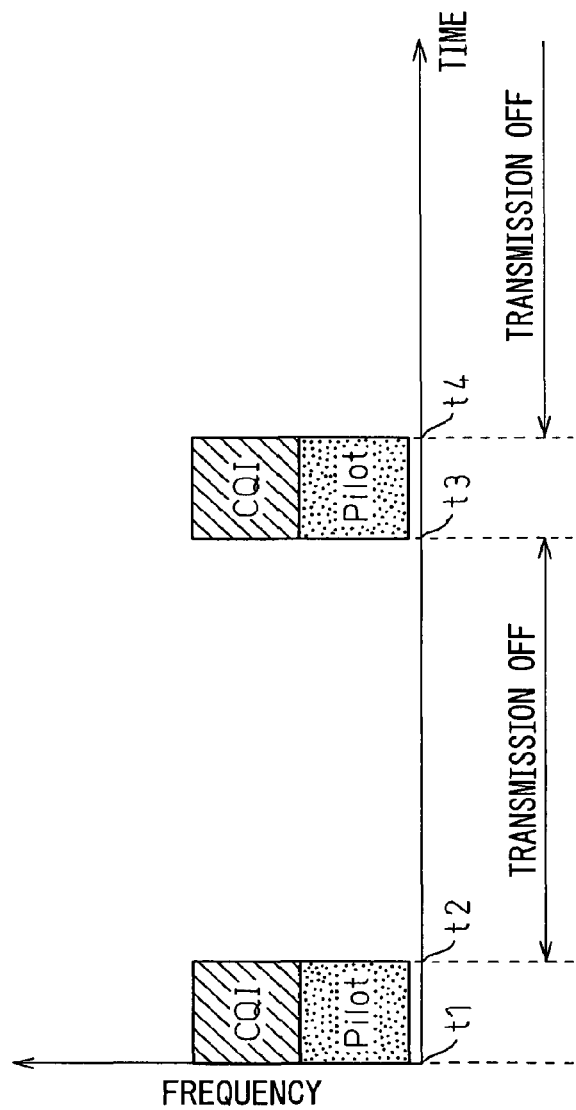

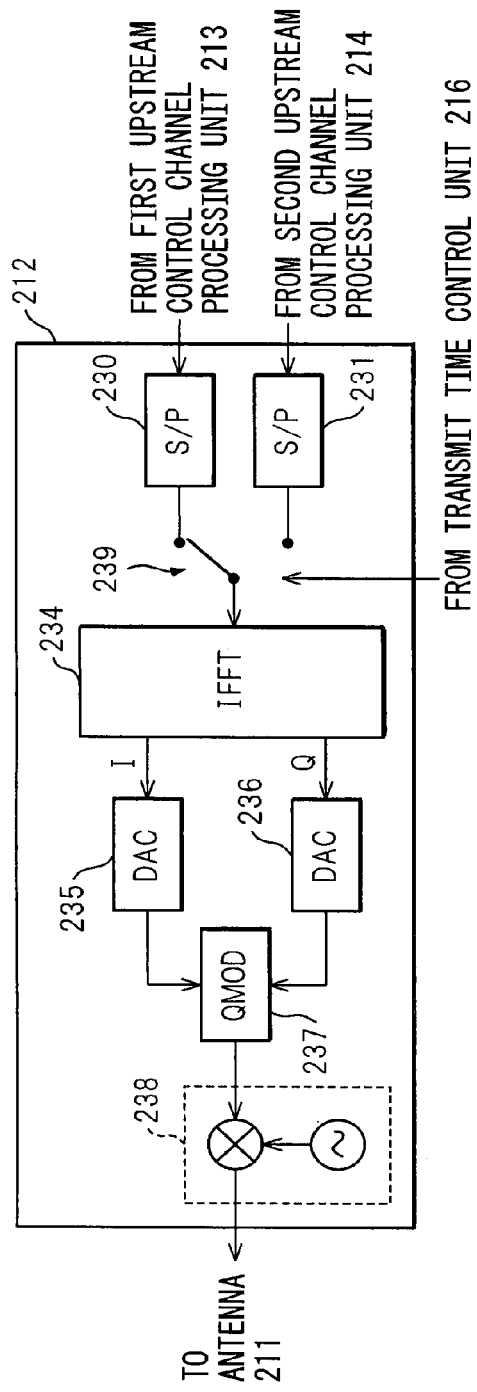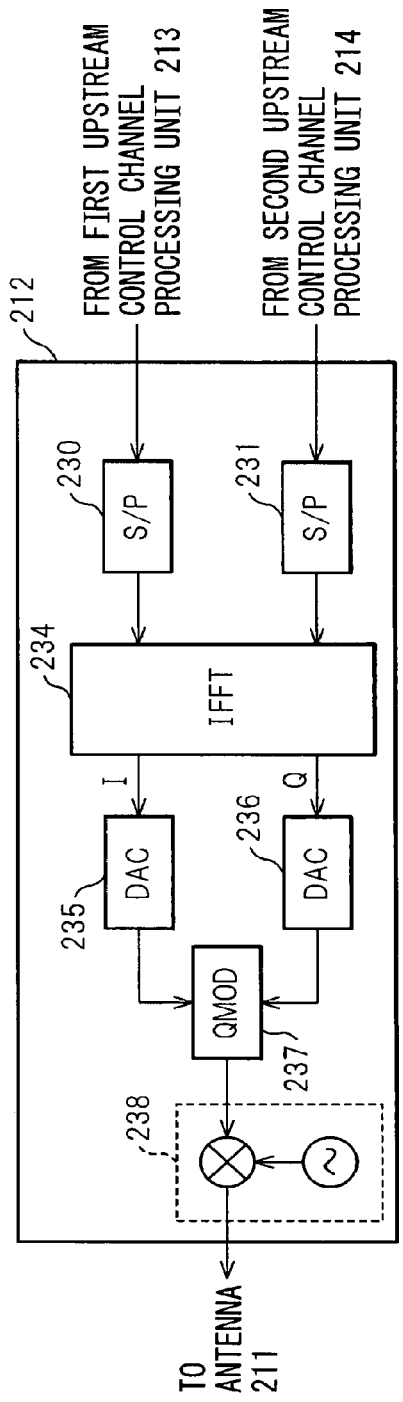

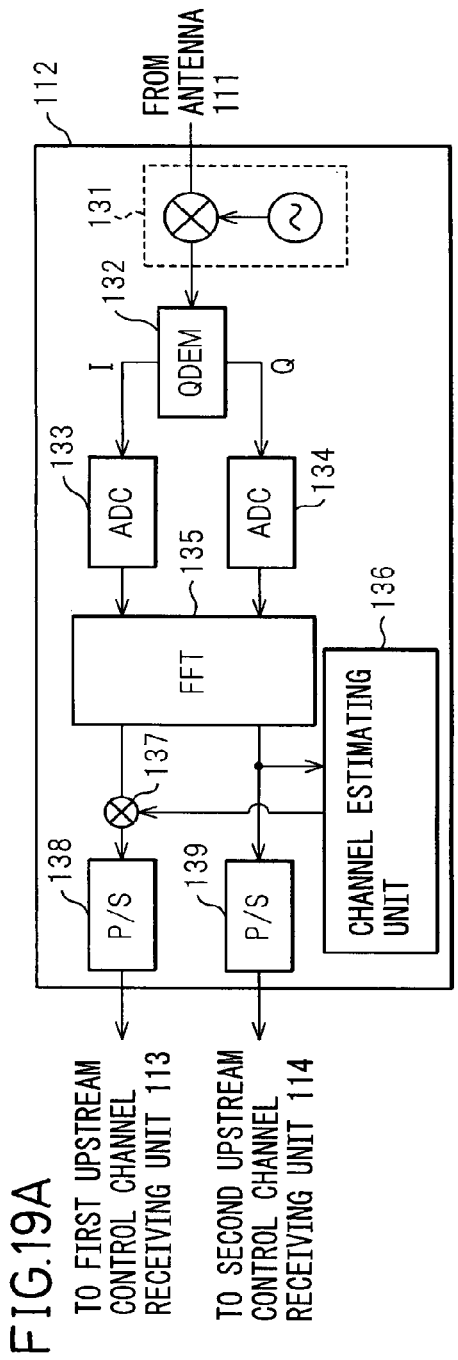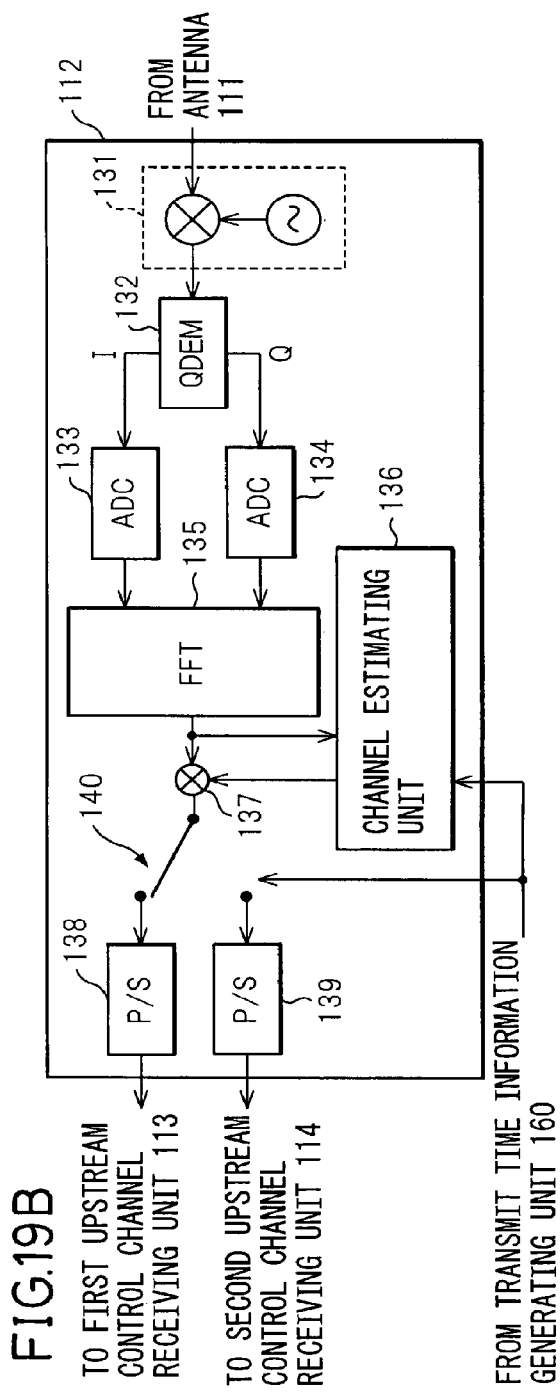

MOBILE USER TERMINAL, MOBILE COMMUNICATION SYSTEM, BASE STATION, AND COMMUNICATION METHOD

CROSS REFERENCE TO RELATED APPLICATION

This application is a continuation of U.S. application Ser. No. 13/172,239, filed on Jun. 29, 2011, now pending, which is a continuation of U.S. patent application Ser. No. 11/892,611 filed on Aug. 24, 2007, now U.S. Pat. No. 8,064,937 B2, which claims the benefit of priority of Japanese Patent Application No. 2006-254525, filed on Sep. 20, 2006, the entire contents of each are herein incorporated by reference. This present application also relates to U.S. patent application Ser. No. 12/786,064 filed on May 24, 2010, now U.S. Pat. No. 7,974,649 B2.

BACKGROUND OF THE INVENTION

1. Field of the Invention

The present invention relates to a mobile communication terminal, mobile communication system, base station, and a communication method for use by them, and more particularly to a control technique for controlling the transmission timing of control information to be transferred between a mobile communication terminal and a base station.

2. Description of the Related Art

FIG. 1 shows the configuration of a UMTS (Universal Mobile Telecommunications System), a mobile communication system standardized by the 3GPP (3rd Generation Partnership Project). The radio communication system 1 comprises a radio access network N1 called a UTRAN (Universal Terrestrial Radio Access Network), a circuit switching core network N2, which connects the radio access network N1 and a public switch telephone network N3 to provide radio switched services, and a packet switching core network N4, which connects the radio access network N1 and an Internet protocol (IP) network N5 to provide packet switched services.

The radio access network N1 comprises base stations BSs and radio network controllers 2 (RNCs) for controlling the BSs, and is responsible for transferring user information, such as voice and packets from mobile user terminals (UEs) to core networks N2 and N4 and vice versa and for allocating radio resources necessary for communications between them.

The circuit switching core network N2 comprises a mobile switching center (MSC) 3 and a gateway mobile switching center (GMSC) 4, and is responsible for establishing communication links between terminals by circuit switching.

The packet switching core network N4 comprises: a serving GPRS support node (SGSN) 5, which keeps track of the position of each mobile user terminal UE accessing the packet switched domain and transfers user traffic between a gateway GPRS support node 6 described below, and the radio access network N1; and the gateway GPRS support node (GGSN) 6, which controls the connection between the mobile communication system 1 and the external IP network N5 in accordance with a connection request from the mobile user terminal UE, the packet switching core network N4 thus providing IP connections between mobile user terminals UEs or between mobile user terminals (UEs) and an external IP network.

The radio communication system 1 further includes a home location register (HLR) 7 and an authentication center (AUC) 8, which performs authentication and manages authentication and other confidential information.

When a mobile user terminal UE is connected to a base station BS, the mobile user terminal (UE) intermittently transmits control information to the base station (BS), i.e., downlink quality information (downlink CQI) that indicates the channel quality of a downlink or a downstream channel along which signals are transmitted from the base station (BS) to the mobile user terminal (UE), and an uplink pilot signal to be used for measuring channel quality of an uplink or an upstream channel along which signals are transmitted from the mobile user terminal (UE) to the base station (BS).

The mobile user terminal (UE) receives a downlink pilot signal transmitted via a common pilot channel from the base station (BS), and measures the channel quality of the downlink propagation path. The result of the measurement is transmitted as downlink quality information to the base station (BS). When downstream traffic occurs from the base station (BS) to the mobile user terminal (UE), the base station (BS) thus supplied with downlink quality information can transmit downstream traffic by selecting the transmission format (modulation method, error-correction method, code rate, etc.) that best matches the conditions of the downlink propagation path.

The mobile user terminal (UE) transmits, the upstream pilot signal to the base station (BS) via an upstream dedicated control channel allocated to each individual terminal. The base station (BS) measures the channel quality of the uplink propagation path by measuring the reception condition of the upstream pilot signal. By measuring the channel quality of the uplink propagation path, the base station (BS) can determine the transmission format (modulation method, error-correction method, code rate, etc.) that best matches the conditions of the uplink propagation path.

In the prior art mobile communication system, the transmission timing and carrier frequency of the downlink quality information and the transmission timing and carrier frequency of the uplink pilot signal have been set independent of each other, and this has led to increased power consumption and increased processing complexity of the transmitter circuit in the mobile user terminal (UE), and thus an increased burden on the mobile user terminal (UE). The reason will be described with reference to FIG. 2.

FIG. 2 is a time chart showing a prior art example of how downlink quality information and uplink pilot signal are transmitted. In FIG. 2, the uplink pilot signal (Pilot) is transmitted at times t1 to t2 and t6 to t7, and irrespective of the timing, downlink quality information (CQI) is transmitted at times t2 to t3, t4 to t5, and t8 to t9.

When transmitting the downlink quality information and uplink pilot signal at such times, the mobile user terminal (UE) has to drive its transmitter circuit at each transmission timing.

Specifically, in the 3.9-generation mobile communication architecture (3GPP LTE), standardization of which is currently underway, a standby state called the MAC-Dormant state is provided as a state in which the mobile user terminal (UE) can take on, in order to enable data transmission/reception to be initiated upon occurrence of traffic. In the MAC-Dormant state, data transmission/reception is not performed, but the mobile user terminal (UE) transmits the downlink quality information and uplink pilot signal in an intermittent fashion.

In the MAC-Dormant state, when neither the downlink quality information nor the uplink pilot signal is transmitted, power is not supplied to the amplifier circuit in the output stage of the transmitter circuit, and the amplifier circuit is driven only intermittently, thereby reducing power consumption. FIG. 3 shows a state transition diagram for the mobile user terminal (UE) as defined by the 3.9-generation mobile communication architecture. In FIG. 3, LTE-Active state indicates a communication state, and the MAC-Active state contained therein indicates a state in which communication is proceeding continuously, while the MAC-Dormant state indicates a state in which control information such as described above is transmitted and received in an intermittent fashion. Conversely, an LTE-Idle state indicates a standby state in which no control information is transmitted or received, and the LTE-Detached state indicates a state in which the power of the mobile user terminal (UE) is OFF.

When driving the amplifier circuit in an intermittent fashion, the amplifier circuit must be energized for a predetermined standby time, before the input of a transmit signal, in order to stabilize the output characteristics of the amplifier circuit. During this standby time, the amplifier circuit does not amplify the transmit signal, and consumes power unnecessarily. As a result, if the transmission timing of the downlink quality information is spaced apart from the transmission timing of the uplink pilot signal, the amount of power unnecessarily consumed increases, because standby time occurs before each transmission timing.

In the 3.9-generation mobile communication architecture, bandwidths of 1.25 MHz, 2.5 MHz, 10 MHz, 15 MHz, and 20 MHz can be used in addition to the 5-MHz bandwidth used in the current third generation mobile communication systems. FIG. 2 shows a case where the mobile user terminal (UE) conforming to such 3.9-generation mobile communication architecture, transmits the uplink pilot signal using a 20-MHz bandwidth channel and downlink quality information using a 5-MHz bandwidth channel.

When changing the transmit signal frequency, the mobile user terminal (UE) optimizes the frequency characteristic of the amplifier circuit in accordance with the carrier frequency in order to enhance power efficiency. The frequency characteristic of the amplifier circuit is varied by changing the bias to be applied to the active device used in the amplifier circuit. However, there is a limit to how fast the active device can follow the change in bias, and when the amount of bias is large, the amount of delay with which the frequency characteristic of the active device changes in response to the change in the bias becomes large.

As a result, when the amount of change of the transmit signal frequency is large, the bias to the active device must be controlled by taking into account the amount of delay with which the frequency characteristic of the active device changes, and this increases the processing complexity of the transmitter circuit within the mobile user terminal (UE). The same problem also occurs when the frequency bandwidth of the transmit signal greatly changes as shown in FIG. 2.

SUMMARY OF THE INVENTION

In view of the above problem, in a mobile communication system in which a mobile user terminal transmits downlink quality information and an uplink pilot signal to a base station, it is an object of the present invention to reduce the burden that has been imposed on the mobile user terminal because the transmission timing and carrier frequency of the downlink quality information and the transmission timing and carrier frequency of the uplink pilot signal have been set independent of each other.

That is, it is an object of the present invention to reduce power consumption by reducing the time that the amplifier circuit for amplifying the downlink quality information signal and the uplink pilot signal within the mobile user terminal has to be energized when the mobile user terminal transmits these control signals in an intermittent fashion.

Furthermore, it is also an object of the present invention to prevent the processing complexity of the transmitter circuit from increasing, because the carrier frequency used for the transmission of the downlink quality information and the carrier frequency used for the transmission of the uplink pilot signal greatly differ from each other, when the mobile user terminal transmits the downlink quality information and the uplink pilot signal.

To achieve the above object, the present invention synchronizes the transmit time of the downlink quality information and the transmit time of the uplink pilot signal relative to each other. By thus synchronizing the transmit times, it is possible to transmit the downlink quality information and the uplink pilot signal at the same time or in successive time periods. This reduces the number of times that the amplifier circuit provided in the output stage of the transmitter circuit of the mobile user terminal has to be energized. Since the time that the amplifier circuit has to be energized prior to the transmission of the signal can be reduced, power consumption is reduced, and the burden on the mobile user terminal is also reduced.

Furthermore, in the present invention, the downlink quality information and the uplink pilot signal are transmitted by using the same carrier frequency or by using adjacent carrier frequencies selected from among a plurality of carrier frequencies preassigned to the mobile user terminal. By setting the carrier frequency in this manner, it is possible to reduce the amount of bias control for the amplifier circuit provided in the output stage of the transmitter circuit of the mobile user terminal, and as a result, processing complexity of the transmitter circuit can be prevented from increasing, and the burden on the mobile user terminal is thus alleviated.

According to a first mode of the present invention, there is provided a mobile user terminal for use in a mobile communication system, in which the mobile user terminal measures downlink channel quality, and transmits downlink quality information indicating the measured downlink channel quality and an uplink pilot signal to be used for measuring uplink channel quality in an intermittent fashion to a base station.

The mobile user terminal comprises a transmit time control unit, which synchronizes the transmit time of the downlink quality information and the transmit time of the uplink pilot signal relative to each other, and thus the transmit time of the downlink quality information and uplink pilot signal to be transmitted in an intermittent fashion are synchronized relative to each other.

The mobile user terminal may comprise a radio transmitting unit, which transmits the downlink quality information and the uplink pilot signal by using the same carrier frequency or by using adjacent carrier frequencies selected from among a plurality of preassigned carrier frequencies.

The transmit time control unit may set the transmission cycle for one of the downlink quality information and the uplink pilot signal to be an integral multiple of the transmission cycle of the other one thereof. Alternatively, the transmit time control unit may control the transmit time so that the downlink quality information and the uplink pilot signal are transmitted at the same time or in succession.

The radio transmitting unit may transmit both the downlink quality information and the uplink pilot signal by using some carrier frequencies clustered in a localized manner and selected from among a plurality of carrier frequencies preassigned within a given frequency band. Alternatively, the radio transmitting unit may transmit both the downlink quality information and the uplink pilot signal by using some carrier frequencies contained in a distributed manner within a given frequency band and selected from among a plurality of carrier frequencies preassigned within the given frequency band. In this case, the radio transmitting unit may transmit the downlink quality information and the uplink pilot signal in an intermittent fashion in accordance with the transmit time controlled by the transmit time control unit.

According to a second mode of the present invention, there is provided a mobile communication system which comprises the mobile user terminal of the first mode of the present invention, wherein the downlink quality information and the uplink pilot signal are transmitted in an intermittent fashion from the mobile user terminal to a base station.

When the mobile user terminal transmits the uplink pilot signal and the downlink quality information at the same time or at times close to each other by using the same frequency or adjacent frequencies, the uplink pilot signal can be used as a reference channel for channel estimation for the downlink quality information.

Accordingly, the base station used in this system may include a channel estimating unit, which performs channel estimation for a channel used for transmission of the downlink quality information, by using the uplink pilot signal received from the mobile user terminal as a reference channel.

According to a third mode of the present invention, there is provided a base station to be used in the mobile communication system of the second mode of the present invention. The base station includes a channel estimating unit, which performs channel estimation for a channel used for transmission of the downlink quality information, by using the uplink pilot signal received from the mobile user terminal as a reference channel.

According to a fourth mode of the present invention, there is provided a communication method in which downlink channel quality is measured at a mobile user terminal, and downlink quality information indicating the measured downlink channel quality and an uplink pilot signal to be used for measuring uplink channel quality are transmitted from the mobile user terminal to a base station.

In this communication method, the downlink quality information and the uplink pilot signal are transmitted in an intermittent fashion from the mobile user terminal to the base station. The mobile user terminal synchronizes the transmit time of the downlink quality information with the transmit time of the uplink pilot signal. The mobile user terminal may transmit the downlink quality information and the uplink pilot signal by using the same carrier frequency or by using adjacent carrier frequencies selected from among a plurality of preassigned carrier frequencies.

When synchronizing the transmit time of the downlink quality information and the transmit time of the uplink pilot signal relative to each other, the transmission cycle for either one of the downlink quality information and the uplink pilot signal may be set to an integral multiple of the transmission cycle for the other, or alternatively, the downlink quality information and the uplink pilot signal are transmitted at the same time or in succession.

Both the downlink quality information and the uplink pilot signal may be transmitted by using carrier frequencies clustered in a localized manner and selected from among a plurality of carrier frequencies preassigned within a given frequency band, or may be transmitted by using carrier frequencies contained in a distributed manner within the given frequency band and selected from among the plurality of carrier frequencies preassigned within the given frequency band.

Furthermore, in this method, channel estimation for a channel used for transmission of the downlink quality information may be performed in the base station by using the uplink pilot signal received from the mobile user terminal as a reference channel.

BRIEF DESCRIPTION OF THE DRAWINGS

The present invention will be more clearly understood from the description as set out below with reference to the accompanying drawings, wherein:

FIG. 9 is a time chart (part 2) showing how the downlink quality information and the uplink pilot signal are transmitted by the mobile user terminal of the present invention;

FIG. 10A is a diagram showing a first configuration example of a radio transmitting unit in the mobile communication terminal shown in FIG. 5;

FIG. 10B is a diagram showing a second configuration example of the radio transmitting unit in the mobile user terminal shown in FIG. 5;

FIG. 19A is a diagram showing a first configuration example of the radio receiving unit in the base station shown in FIG. 4 when the radio transmitting unit is configured to perform channel estimation for the downlink quality information;

FIG. 19B is a diagram showing a second configuration example of the radio receiving unit in the base station shown in FIG. 4 when the radio transmitting unit is configured to perform channel estimation for the downlink quality information.

DESCRIPTION OF THE PREFERRED EMBODIMENTS

Figure 1:
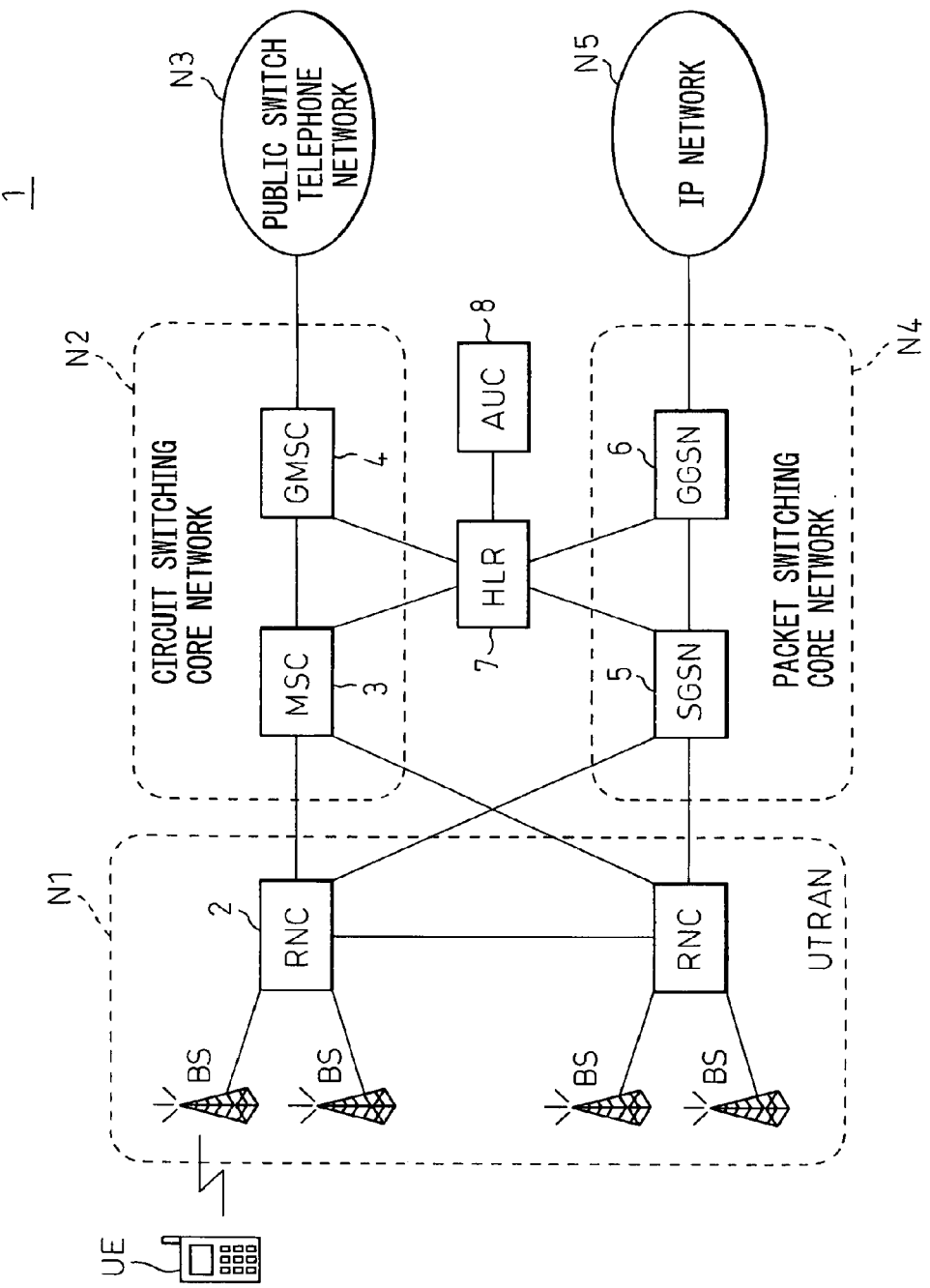
FIG. 1 is a diagram showing the configuration of a mobile communication system standardized by the 3GPP.
Figure 2:
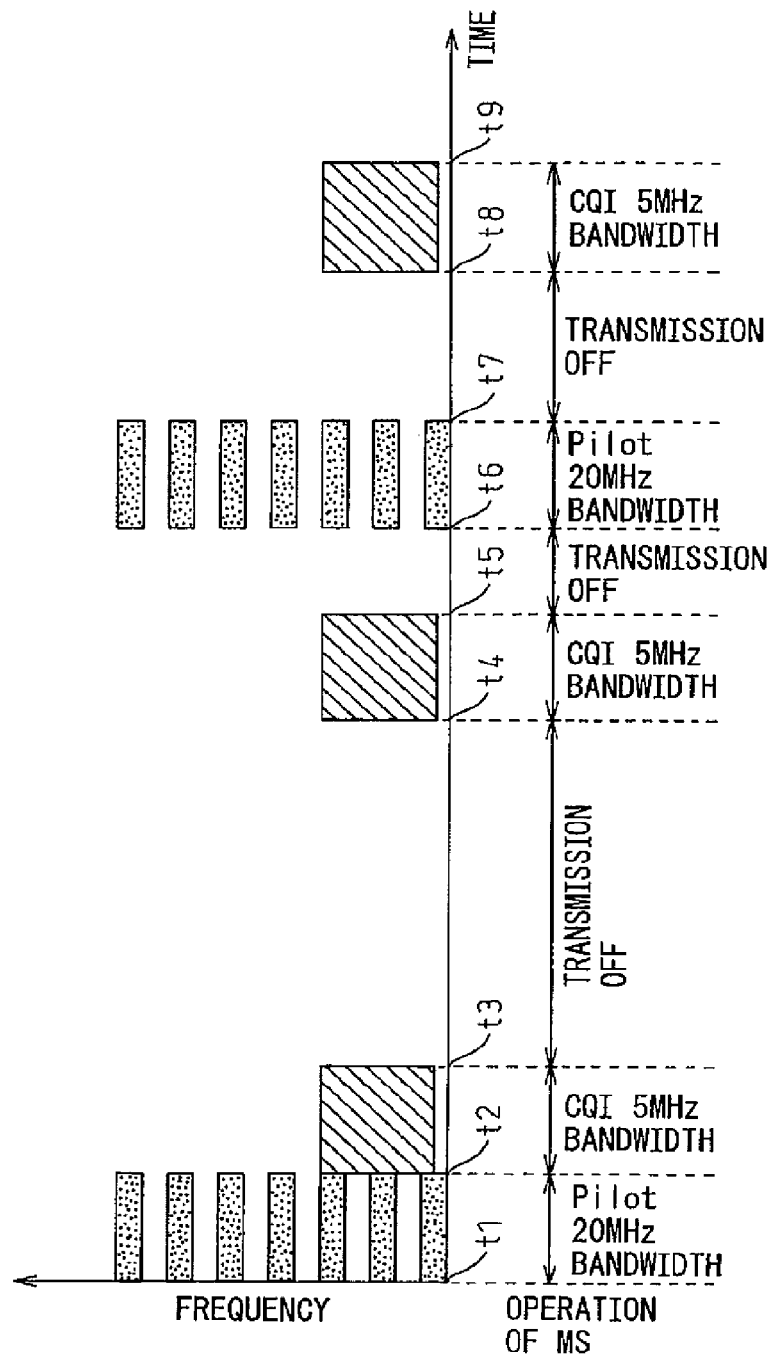
FIG. 2 is a time chart showing a prior art example of how downlink quality information and an uplink pilot signal are transmitted.
Figure 3:
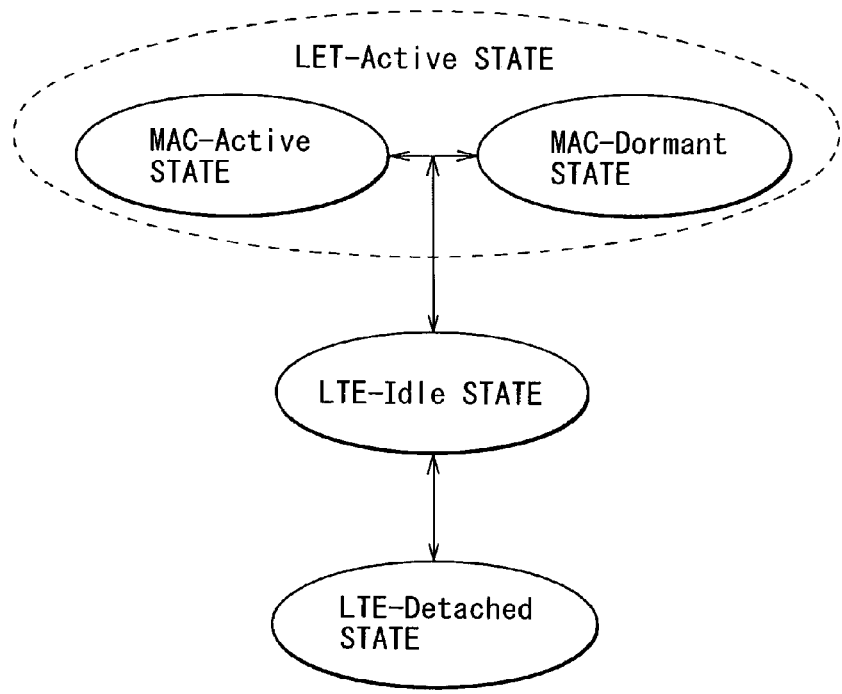
FIG. 3 is a state transition diagram for a mobile user terminal (UE) as defined by the 3.9-generation mobile communication architecture.
Figure 4:
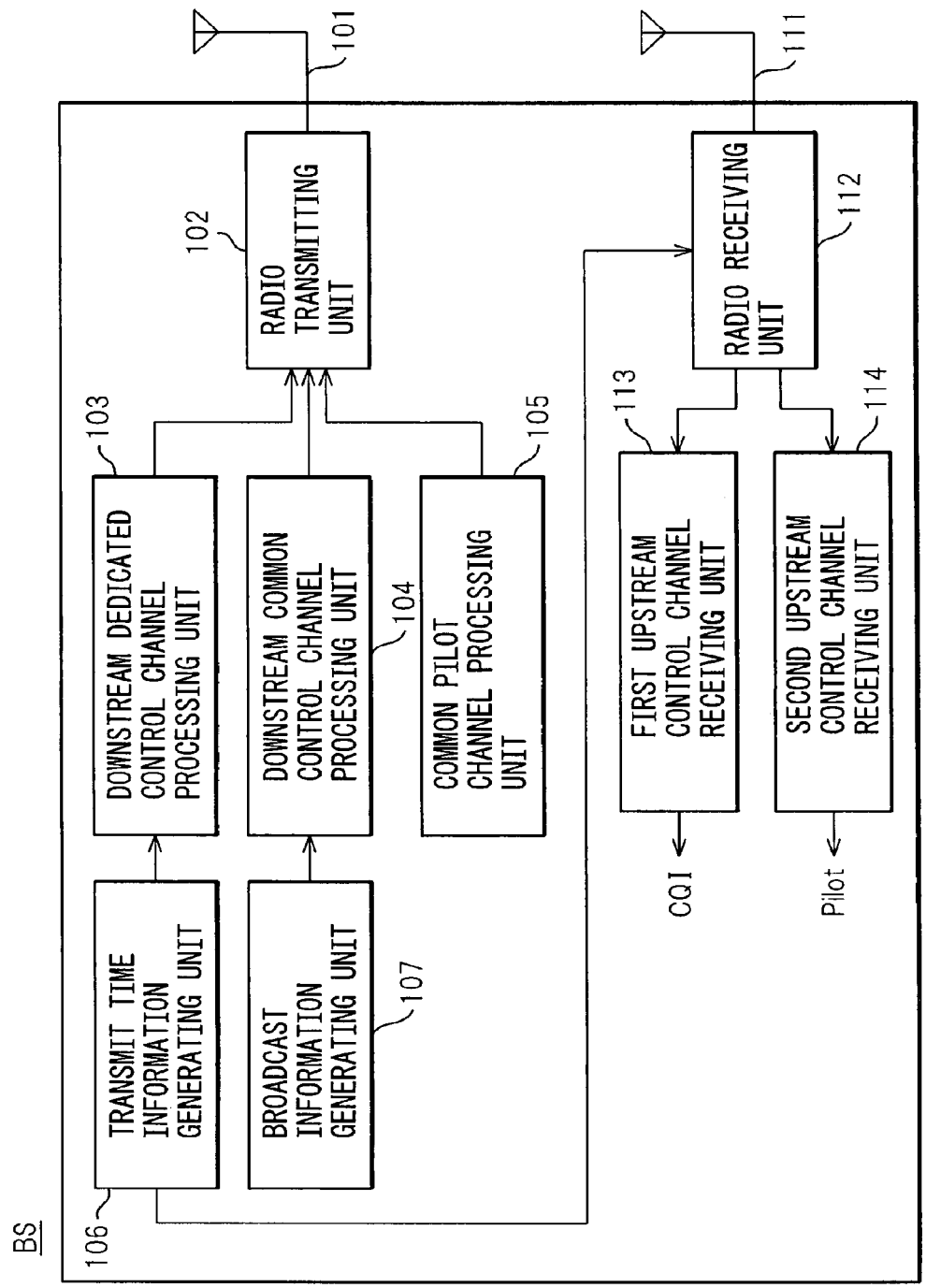
FIG. 4 is a schematic block diagram showing the configuration of a base station according to an embodiment of the present invention.
Figure 5:
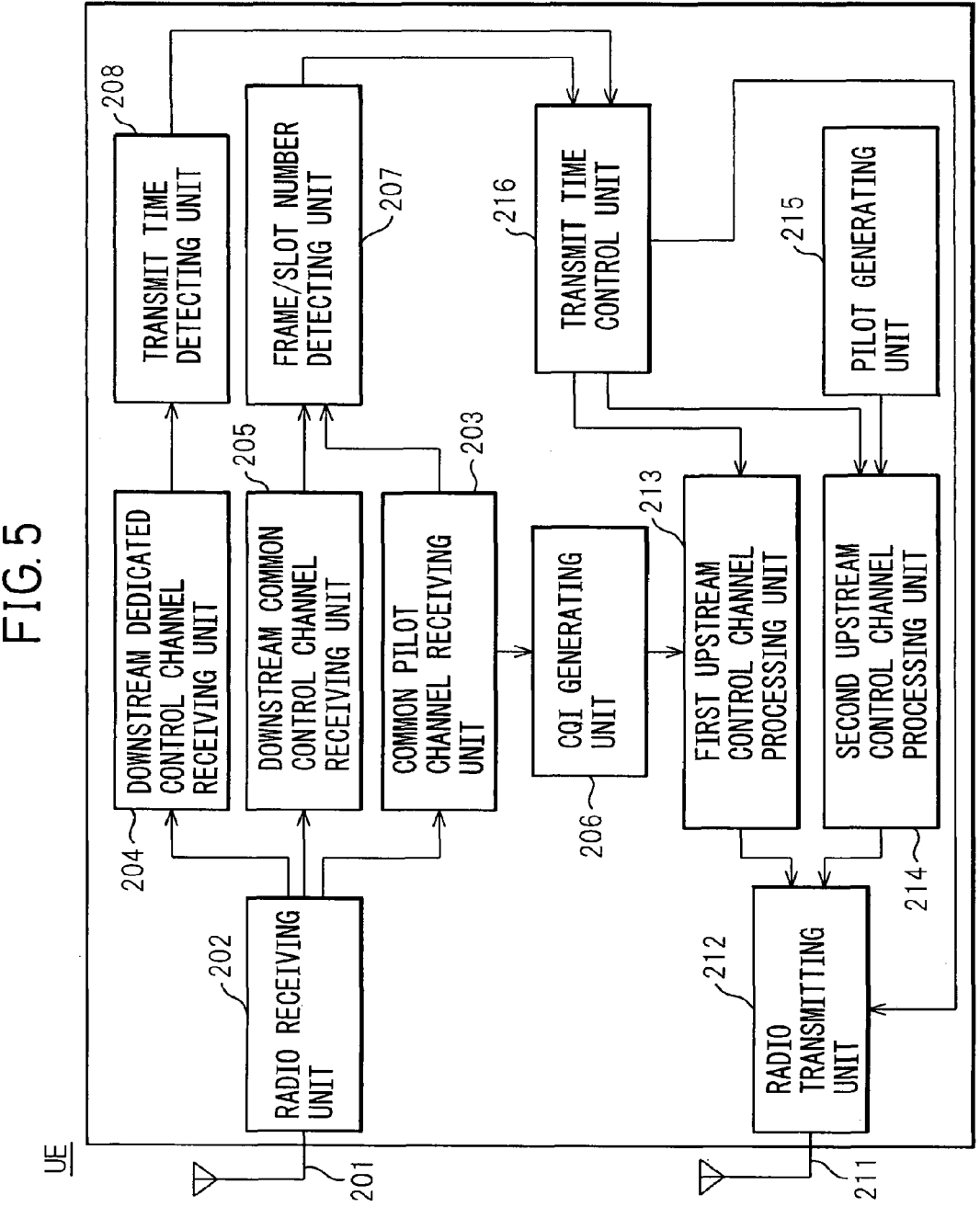
FIG. 5 is a schematic block diagram showing the configuration of a mobile user terminal according to the embodiment of the present invention.

The preferred embodiments of the present invention will be described in detail below while referring to the attached figures. FIG. 4 is a schematic block diagram showing the configuration of a base station according to an embodiment of the present invention, and FIG. 5 is a schematic block diagram showing the configuration of a mobile user terminal according to the embodiment of the present invention. The configuration of the mobile user system according to the embodiment of the present invention is generally the same as that of the mobile communication system previously described with reference to FIG. 1, and therefore, the description thereof will not be repeated here. The mobile communication system of the present invention supports the 3.9-generation mobile communication architecture, and the mobile user terminal (UE) shown in FIG. 5 can take on any one of the states shown in the state transition diagram of FIG. 3.

The base station (BS) shown in FIG. 4 comprises a transmitting antenna 101 and a radio transmitting unit 102 for transmitting radio signals downstream to the mobile user terminal UE. The downstream radio signals include various kinds of control information that are transmitted over a downstream dedicated control channel, a downstream common control channel, and a common pilot channel, respectively.

The downstream dedicated control channel is a dedicated control channel, which is assigned to each individual mobile user terminal (UE) for the transmission of control information from the base station (BS) to the individual mobile user terminal (UE), the downstream common control channel is a control channel over which the base station (BS) transmits control information to all mobile user terminals (UEs) simultaneously, and the common pilot channel is a control channel over which the base station (BS) transmits the downlink pilot signal to all mobile user terminals (UEs) simultaneously.

The base station (BS) includes: a downstream dedicated control channel processing unit 103 and a downstream common control channel processing unit 104 which perform processing for the transmission of the signals over the downstream dedicated control channel and the downstream common control channel, respectively, and a common pilot channel processing unit 105, which outputs the downlink pilot signal to be transmitted over the common pilot channel.

The base station (BS) further includes a receiving antenna 111 and a radio receiving unit 112 for receiving upstream radio signals from the mobile user terminal (UE). The upstream radio signals include various kinds of control information that are transmitted over a first and second upstream control channel, respectively.

The first and second upstream control channels are control channels over which each individual mobile user terminal (UE) can transmit their control information. Such control channels may be configured as shared control channels which are assigned, from among common physical channel resources, to each individual mobile user terminal (UE) by changing the time slot, frequency, or spreading code for each mobile user terminal (UE), or may be configured as dedicated control channels that are individually assigned to each different mobile user terminal (UE).

The base station (BS) includes a first upstream control channel receiving unit 113 and a second upstream control channel receiving unit 114, which perform processing for the reception of control information transmitted over the first and second upstream control channels, respectively.

The base station (BS) further includes a transmit time information generating unit 106, which creates transmit time information for specifying the transmit time at which the mobile user terminal (UE) should transmit the downlink quality information or the uplink pilot signal. The transmit time information generating unit 106 supplies the transmit time information to the downstream dedicated control channel processing unit 103, which transmits the transmit time information to the mobile user terminal (UE) over the downstream dedicated control channel. A method of how the transmit time of the downlink channel quality information or the uplink pilot signal is specified by the transmit time information will be described later by way of example. Here, the transmit time information may be created, not in the base station (BS), but in its serving radio network controller 2 shown in FIG. 1. In which, the transmit time information generating unit 106 is provided in the radio network controller 2, not in the base station (BS).

Referring back to FIG. 4, the base station (BS) further includes a broadcast information generating unit 107, which creates broadcast information. The broadcast information contains a frame number indicating the ordinal position of the frame that carries the downlink pilot signal currently being transmitted from the common pilot channel processing unit 105. The broadcast information generating unit 107 supplies the broadcast information to the downstream common control channel processing unit 104, which transmits the broadcast information to the mobile user terminal (UE) over the downstream common control channel.

The mobile user terminal (UE) shown in FIG. 5 comprises: a receiving antenna 201; a radio receiving unit 202 for receiving downstream radio signals from the base station BS; a common pilot channel receiving unit 203, which performs processing for the reception of the downlink pilot signal transmitted over the common pilot channel; a downstream dedicated control channel receiving unit 204, which performs processing for the reception of the control information transmitted over the downstream dedicated control channel; and a downstream common control channel receiving unit 205, which performs processing for the reception of the control information transmitted over the downstream common control channel.

The mobile user terminal (UE) further comprises: a transmitting antenna 211; a radio transmitting unit 212 for transmitting upstream radio signals to the base station BS; a first upstream control channel processing unit 213, which performs processing for the transmission of the signal over the first upstream control channel; and a second upstream control channel processing unit 214, which performs processing for the transmission of the signal over the second upstream control channel.

The mobile user terminal (UE) further includes a CQI generating unit 206, a pilot generating unit 215, a frame/slot number detecting unit 207, a transmit time detecting unit 208, and a transmit time control unit 216.

The CQI generating unit 206 measures quality metrics such as the SIR (Signal to Interference Ratio) of the common pilot channel, etc., that indicate the downlink channel quality, generates downlink quality information containing such quality metrics, and supplies it to the first upstream control channel processing unit 213. The downlink quality information is transmitted to the base station (BS) over the first upstream control channel.

The pilot generating unit 215 generates the uplink pilot signal that the base station (BS) uses to measure the uplink channel quality, and supplies the pilot signal to the second upstream control channel processing unit 214. The uplink pilot signal is transmitted to the base station (BS) over the second upstream control channel.

The frame/slot number detecting unit 207 detects the frame number of the currently received downlink pilot contained in the broadcast information received by the downstream common control channel receiving unit 205. The frame/slot number detecting unit 207 also detects the slot number of the current time slot by measuring the time that has elapsed since the common pilot channel receiving unit 203 began to receive the downlink pilot of the current frame.

The transmit time detecting unit 208 detects the transmit time information from the control information transmitted over the downstream dedicated control channel and received by the downstream dedicated control channel receiving unit 204.

The transmit time control unit 216 receives the transmit time information from the transmit time detecting unit 208 and the frame number and slot number of the current time slot from the frame/slot number detecting unit 207. Then, by referring to the transmit time information received from the transmit time detecting unit 208, the transmit time control unit 216 determines whether the current time slot is a time slot for signal transmission, i.e., the slot for the transmission of the downlink channel quality information or the uplink pilot signal.

Each time it is determined that the current time slot is the slot for transmitting the downlink channel quality information, the transmit time control unit 216 outputs a transmission permit signal permitting the first upstream control channel processing unit 213 to transmit the downlink quality information, and each time it is determined that the current time slot is the slot for transmitting the uplink pilot signal, the transmit time control unit 216 outputs a transmission permit signal permitting the second upstream control channel processing unit 214 to transmit the uplink pilot signal. With this operation, the transmit time control unit 216 allows the downlink quality information and the uplink pilot signal to be transmitted in an intermittent fashion, while maintaining synchronization between their transmit times.

Figure 6:
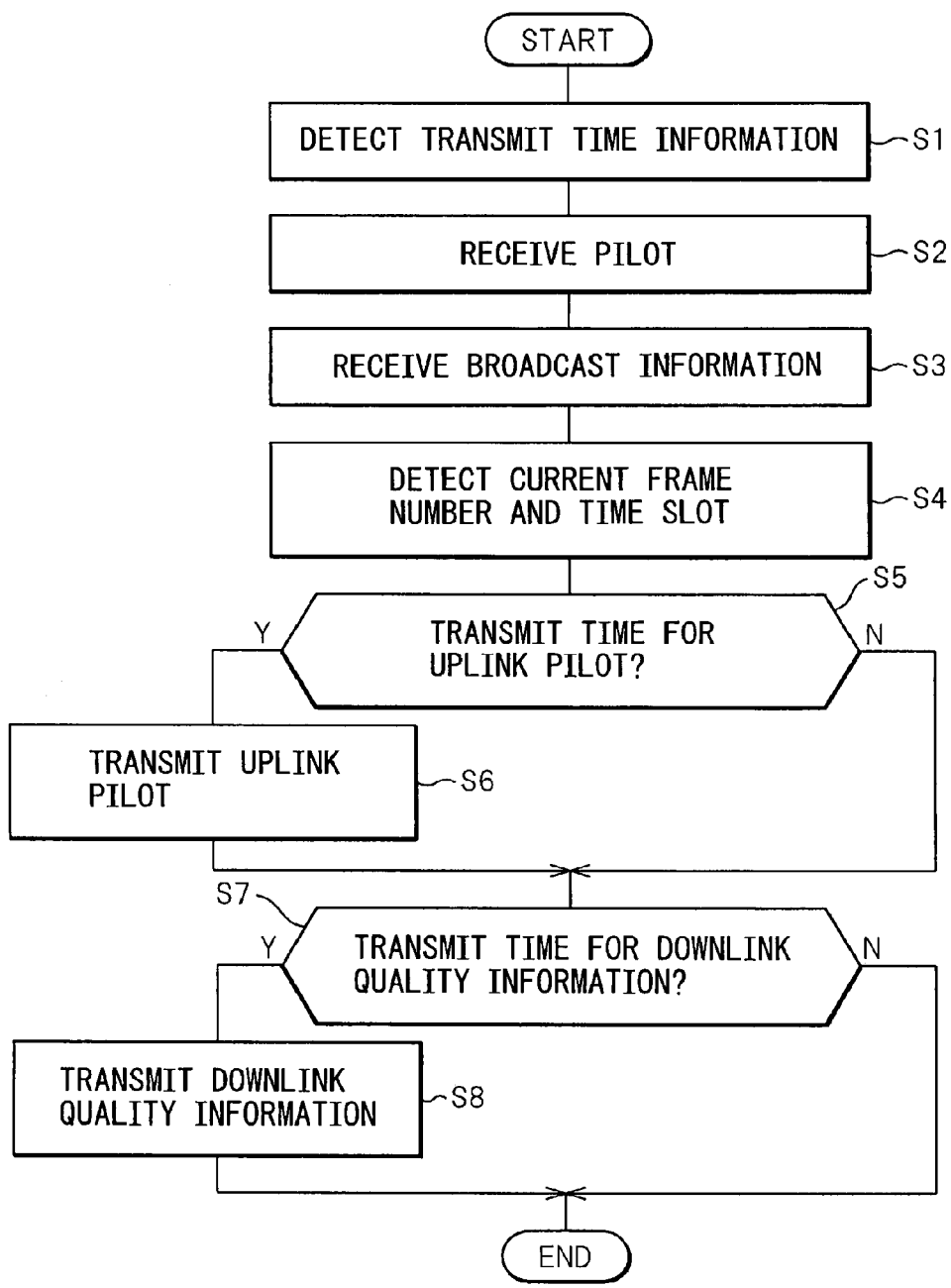
FIG. 6 is a flowchart illustrating the operation of the mobile user terminal shown in FIG. 5 when transmitting the downlink quality information and the uplink pilot.

FIG. 6 is a flowchart illustrating the operation of the mobile user terminal (UE) shown in FIG. 5 when transmitting the downlink quality information and the uplink pilot.

In step S1, the downstream dedicated control channel receiving unit 204 receives via the downstream dedicated control channel the transmit time information that was generated by the transmit time information generating unit 106 in the base station (BS) and that specifies the transmit time for the downlink quality information or the uplink pilot signal. The transmit time detecting unit 208 detects the transmit time information specifically intended for the mobile user terminal UE from among the signals that the downstream dedicated control channel receiving unit 204 received via the downstream dedicated control channel.

The transmit time information is information by reference to which the transmit time control unit 216 determines the times at which the transmission permit signal for the downlink quality information and the transmission permit signal for the uplink pilot signal should be output to the first and second upstream control channel processing units 213 and 214, respectively. The transmit time information may provide, for example, a frame number and a slot number that specify the time slot for transmitting either or both the downlink quality information and the uplink pilot signal.

If for example, the transmission cycle of the downlink quality information and the transmission cycle of the uplink pilot signal are predetermined, the frame number containing the time slot assigned to the mobile user terminal (UE) as the transmit time may be specified by the number, n, of frames corresponding to the transmission cycle and the remainder resulting from the division of the frame number by the number, n, of frames.

When the common pilot channel receiving unit 203 receives the downlink pilot signal in step S2, the CQI generating unit 206 generates the downlink channel quality information. The common pilot channel receiving unit 203 also supplies the downlink pilot signal to the frame/slot number detecting unit 207.

In step S3, the downstream common control channel receiving unit 205 receives via the downstream common control channel the broadcast information that was generated by the broadcast information generating unit 107 in the base station BS.

Then, in step S4, the frame/slot number detecting unit 207 detects the frame number of the currently received downlink pilot signal from the broadcast information. Further, the frame/slot number detecting unit 207 detects the slot number of the current time slot.

Figure 7:
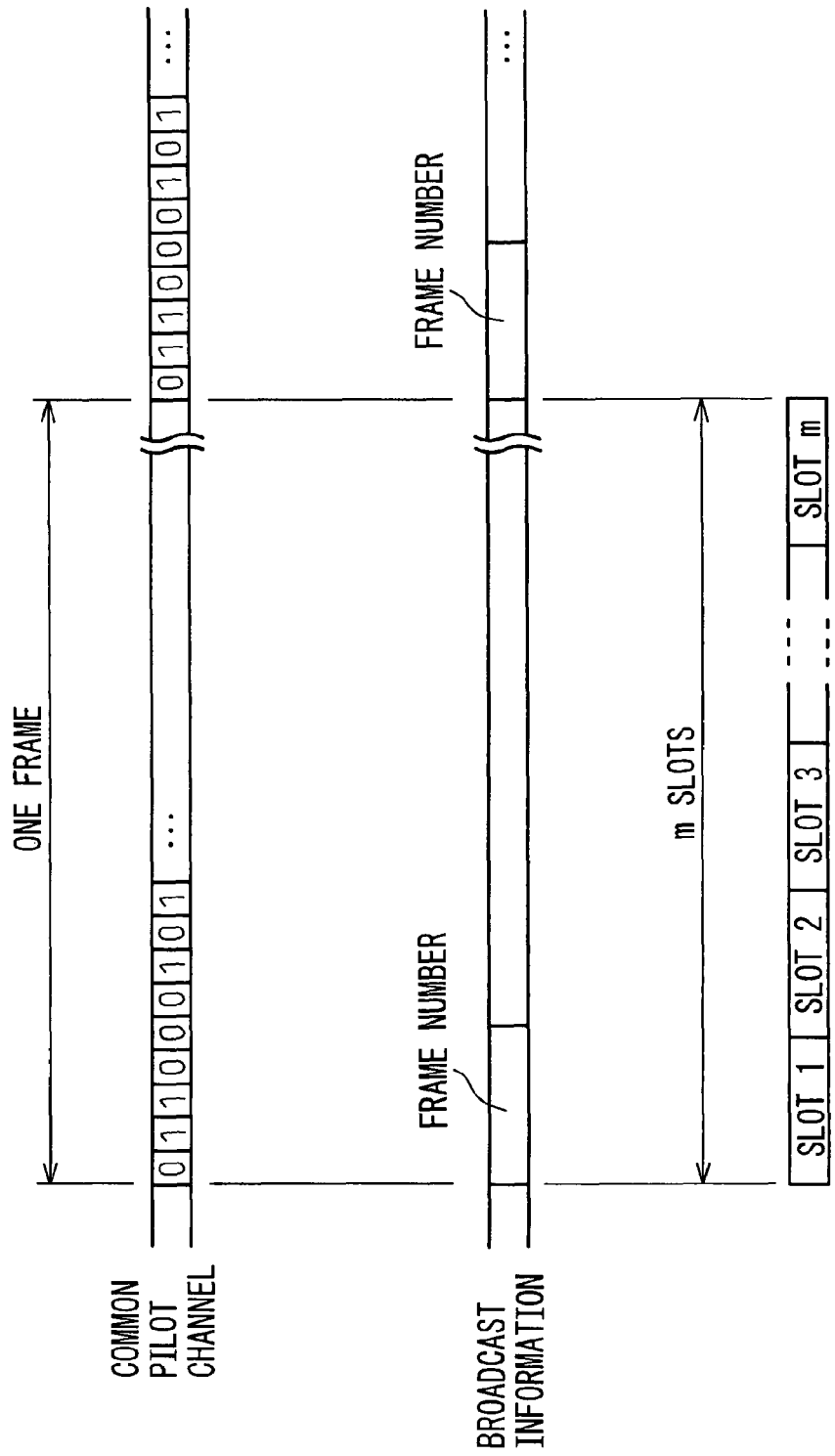
FIG. 7 is a time chart for the downlink pilot signal and broadcast information.

FIG. 7 is a time chart for the downlink pilot signal and the broadcast information. The downlink pilot signal flowing on the common pilot channel has a signal pattern which repeats a known bit pattern for each frame. The broadcast information contains the frame number of the currently transmitted downlink pilot signal. Since the bit pattern of the downlink pilot signal is known, the frame/slot number detecting unit 207 can determine the start time of the current frame by matching the currently received downlink pilot signal against the known bit pattern.

As shown, one frame is made up of a predetermined number of slots (m slots in the illustrated example) each of a known duration. The frame/slot number detecting unit 207 can determine the slot number of the current time slot by determining the time elapsed from the start time of the current frame.

Referring back to FIG. 6, the transmit time control unit 216 determines in step S5 whether the current time slot whose frame number and slot number were detected in step S4 coincides with the transmit time that the transmit time information detected in step S1 specifies for the uplink pilot signal.

For example, when the transmit time information designates the frame number and slot number of the time slot for transmitting the uplink pilot signal, the transmit time control unit 216 determines whether the combination of the frame number and slot number of the time slot thus designated matches the combination of the frame number and slot number of the current time slot. If they match, it is determined that the current time slot is the transmit time, but if they do not match, it is determined that the current time slot is not the transmit time.

On the other hand, when the transmit time information designates only the frame number and slot number of the time slot for transmitting the downlink quality information, the transmit time control unit 216 determines whether the combination of the frame number and slot number of the current time slot satisfies a prescribed relationship with respect to the combination of the frame number and slot number of the time slot thus designated. If they satisfy the prescribed relationship, it is determined that the current time slot is the transmit time, but if they do not satisfy the prescribed relationship, it is determined that the current time slot is not the transmit time.

Various relationships can be employed for the prescribed relationship. For example, the frame number/slot number combination is identical, or the time slot for transmitting the uplink pilot signal is advanced or delayed by a prescribed number of slots with respect to the time slot for transmitting the downlink quality information.

Based on the time required to transmit the downlink quality information and the time required to transmit the uplink pilot signal, the transmit time control unit 216 may determine the transmit time of the uplink pilot signal so that the uplink pilot signal and the downlink quality information which is transmitted in the specified time slot are transmitted in succession.

If it is determined in step S5 that the time slot coincides with the transmit time for the uplink pilot signal, the transmit time control unit 216 in step S6 outputs the transmission permit signal permitting the second upstream control channel processing unit 214 to transmit the uplink pilot signal. If the transmit time control unit 216 determines in step S5 that the time slot does not coincide with the transmit time for the uplink pilot signal, the process proceeds to step S7.

In step S7, the transmit time control unit 216 determines whether the current time slot whose frame number and slot number were detected in step S4 coincides with the transmit time that the transmit time information detected in step S1 specifies for the downlink quality information.

For example, when the transmit time information designates the frame number and slot number of the time slot for transmitting the downlink quality information, the transmit time control unit 216 determines whether the combination of the frame number and slot number of the time slot thus designated matches the combination of the frame number and slot number of the current time slot. If they match, it is determined that the current time slot is the transmit time, but if they do not match, it is determined that the current time slot is not the transmit time.

On the other hand, for example, when the transmit time information designates only the frame number and slot number of the time slot for transmitting the uplink pilot signal, the transmit time control unit 216 determines whether the combination of the frame number and slot number of the current time slot satisfies the prescribed relationship with respect to the combination of the frame number and slot number of the time slot thus designated; if they satisfy the prescribed relationship, it is determined that the current time slot is the transmit time, but if they do not satisfy the prescribed relationship, it is determined that the current time slot is not the transmit time.

Based on the time required to transmit the downlink quality information and the time required to transmit the uplink pilot signal, the transmit time control unit 216 may determine the transmit time of the downlink quality information so that the downlink quality information and the uplink pilot signal which is transmitted in the specified time slot are transmitted in succession.

If it is determined in step S7 that the time slot coincides with the transmit time for the downlink quality information, the transmit time control unit 216 in step S8 outputs the transmission permit signal permitting the first upstream control channel processing unit 213 to transmit the downlink quality information.

By operating in accordance with the flowchart shown in FIG. 6, the mobile user terminal (UE) can synchronize the transmit time of the downlink quality information and the transmit time of the uplink pilot signal relative to each other. For example, when the time required to transmit the uplink pilot signal (Pilot) and the time required to transmit the downlink quality information (CQI) are known, the transmit time control unit 216 synchronizes the transmit time t2 of the downlink quality information relative to the transmit time t1 of the uplink pilot signal so that the transmit period t2 to t3 for the downlink quality information immediately follows the transmit period t1 to t2 for the uplink pilot signal, as shown in FIG. 8.

Figure 8:
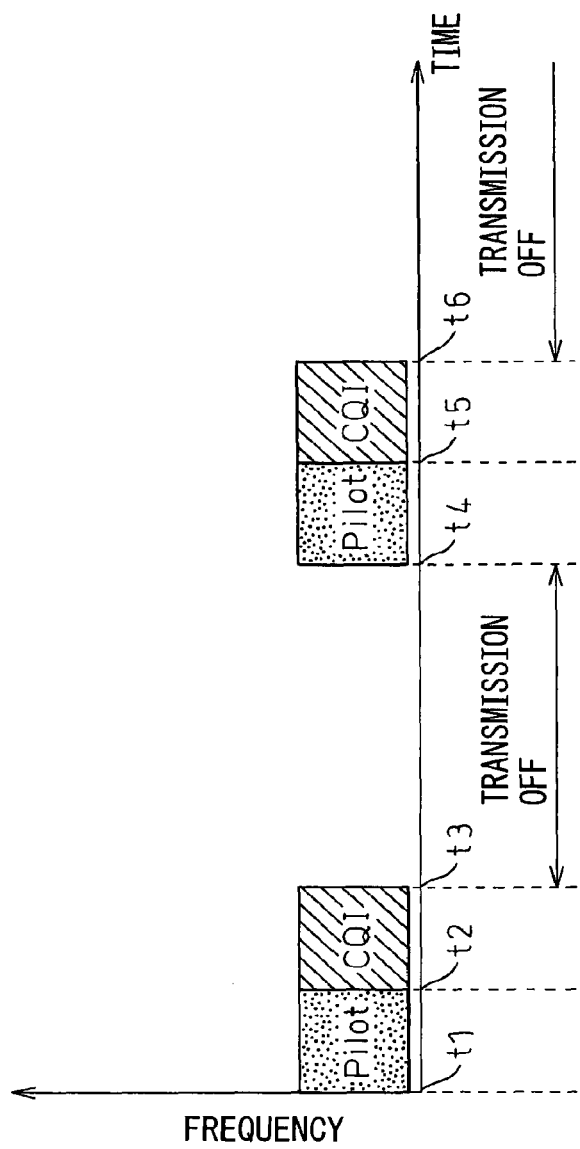
FIG. 8 is a time chart (part 1) showing how the downlink quality information and the uplink pilot signal are transmitted by the mobile user terminal of the present invention.

In the example shown in FIG. 8, the uplink pilot signal is transmitted during time periods t1 to t2 and t4 to t5, and downlink quality information is transmitted during time periods t2 to t3 and t5 to t6 using the same frequency band as the uplink pilot signal, during time period t3 to t4, the signal transmission from the mobile user terminal (UE) is off. Here, the transmission cycle of the uplink pilot signal is the same as that of the downlink quality information.

In the example of FIG. 8, since the radio transmitting unit 212 transmits the uplink pilot signal and the downlink quality information using the same frequency band, upstream control channels that use the same frequency band but use different times or spreading codes may be assigned to the first upstream control channel and the second upstream control channel for transmitting the respective signals, or the first upstream control channel and the second upstream control channel may be assigned as the same upstream control channel.

Next, in the example shown in FIG. 9 for the transmission of the downlink quality information and the uplink pilot signal, the transmit time control unit 216 synchronizes the transmit time of the downlink quality information relative to the transmit time of the uplink pilot signal so that the transmit time of the downlink quality information coincides with the transmit time of the uplink pilot signal.

In the example of FIG. 9, both the downlink quality information and the uplink pilot signal are transmitted together during time periods t1 to t2 and t3 to t4, during time period t2 to t3, the signal transmission from the mobile user terminal (UE) is off. Here, the transmission cycle of the uplink pilot signal is the same as that of the downlink quality information.

In the example of FIG. 9, the radio transmitting unit 212 transmits the uplink pilot signal and the downlink quality information using different frequency bands. To prevent the processing complexity of the radio transmitting unit 212 from increasing as earlier described as a result of increased difference between the transmission frequency of one control information and that of the other control information, the radio transmitting unit 212 assigns adjacent carrier frequencies for the transmission of the uplink pilot signal and the downlink quality information from among several carrier frequencies assigned to the mobile user terminal (UE).

A multi-carrier transmitter circuit, such as an orthogonal frequency division multiplexing (OFDM) transmitter, which transmits signals on multiple carrier frequencies may be employed as the radio transmitting unit 212. The radio transmitting unit 212 then may transmit either one or both of the uplink pilot signal and the downlink quality information in parallel on multiple carrier frequencies. FIGS. 10A and 10B are diagrams each showing an example of the radio transmitting unit 212 configured as an OFDM transmitting circuit.

As shown in FIGS. 10A and 10B, the radio transmitting unit 212 includes: serial-parallel conversion circuits 230 and 231, which convert the uplink pilot signal and the downlink quality information respectively output from the first and second upstream control channel processing units 213 and 214 into parallel signals; an inverse Fourier transform circuit 234, which applies an inverse Fourier transform to the parallel signals converted by the serial-parallel conversion circuits 230 and 231; digital-to-analog conversion circuits 235 and 236, which convert the digital quadrature signals output from the inverse Fourier transform circuit 234 into analog quadrature signals; a quadrature modulator (QMOD) 237, which quadrature-modulates the analog quadrature signals; and a frequency conversion circuit 238, which converts the quadrature-modulated transmit signal into a radio frequency signal. In the block diagrams of FIGS. 10A and 10B, only the portions necessary for transmitting the uplink pilot signal and the downlink quality information are shown for, however the radio transmitting unit 212 further includes component elements necessary for transmission of other control signals, packet data, and voice data.

The radio transmitting unit 212 shown in FIG. 10A includes a switch 239, which under the control of the first and second upstream control channel transmission permit signals output from the transmit time control unit 216, operates in such a manner that, during the transmit time of the first upstream control channel, the output of the serial-parallel conversion circuit 230 that takes the input signal from the first upstream control channel processing unit 213 and converts it into a parallel signal is coupled to an input terminal of the inverse Fourier transform circuit 234 and, during the transmit time of the second upstream control channel, the output of the serial-parallel conversion circuit 231 that takes the input signal from the second upstream control channel processing unit 214 and converts it into a parallel signal is coupled to the same input terminal of the inverse Fourier transform circuit 234. Therefore, the inverse Fourier transform circuit 234 assigns the same frequency band to the first and second upstream control channels, so that the uplink pilot signal and the downlink quality information are transmitted using carriers of the same frequency.

Figure 11:
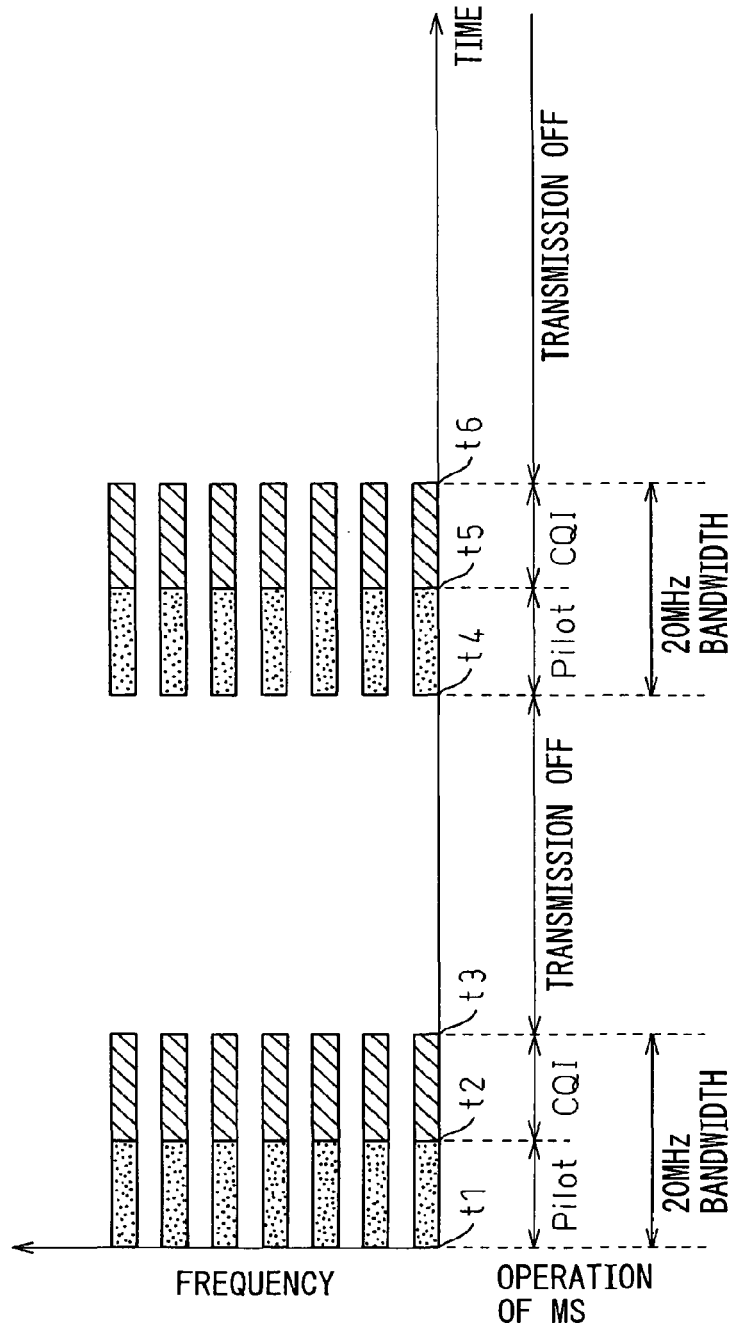
FIG. 11 is a time chart (part 1) showing how the downlink quality information and the uplink pilot signal are transmitted out in a distributed manner from the mobile user terminal of the present invention.

FIG. 11 is a time chart showing how the uplink pilot signal and the downlink quality information are transmitted out from the radio transmitting unit 212 shown in FIG. 10A. As shown, the uplink pilot signal is divided between multiple carrier frequencies and transmitted in parallel on the multiple carrier frequencies, and the downlink quality information also is divided between multiple carrier frequencies and transmitted in parallel on the multiple carrier frequencies. Transmit times t1 and t2 of these control signals are synchronized relative to each other so that the transmit period t1 to t2 for transmitting the uplink pilot signal is immediately followed by the transmit period t2 to t3 for transmitting the downlink quality information, and the uplink pilot signal and the downlink quality information are transmitted using the carriers of the same frequency.

In the transmission method shown in FIG. 11, the downlink quality information and the uplink pilot signal are each transmitted out in a so-called distributed manner in order to reduce the effect of noise on the entire signal if noise occurs in a portion of the frequency band. That is, the inverse Fourier transform circuit 234 selects carrier frequencies distributed among the plurality of carrier frequencies lying within a given frequency band assigned to the mobile user terminal (UE), and assigns selected carrier frequencies for the transmission of the downlink quality information and the uplink pilot signal.

In the radio transmitting unit 212 shown in FIG. 10B, the output signal of the serial-parallel conversion circuit 230 and the output signal of the serial-parallel conversion circuit 231 are coupled to different input terminals of the inverse Fourier transform circuit 234. As a result, the uplink pilot signal and the downlink quality information are transmitted using carriers of different frequencies, and these control signals can be transmitted at the same time in the same manner as previously described with reference to FIG. 9.

Figure 12:
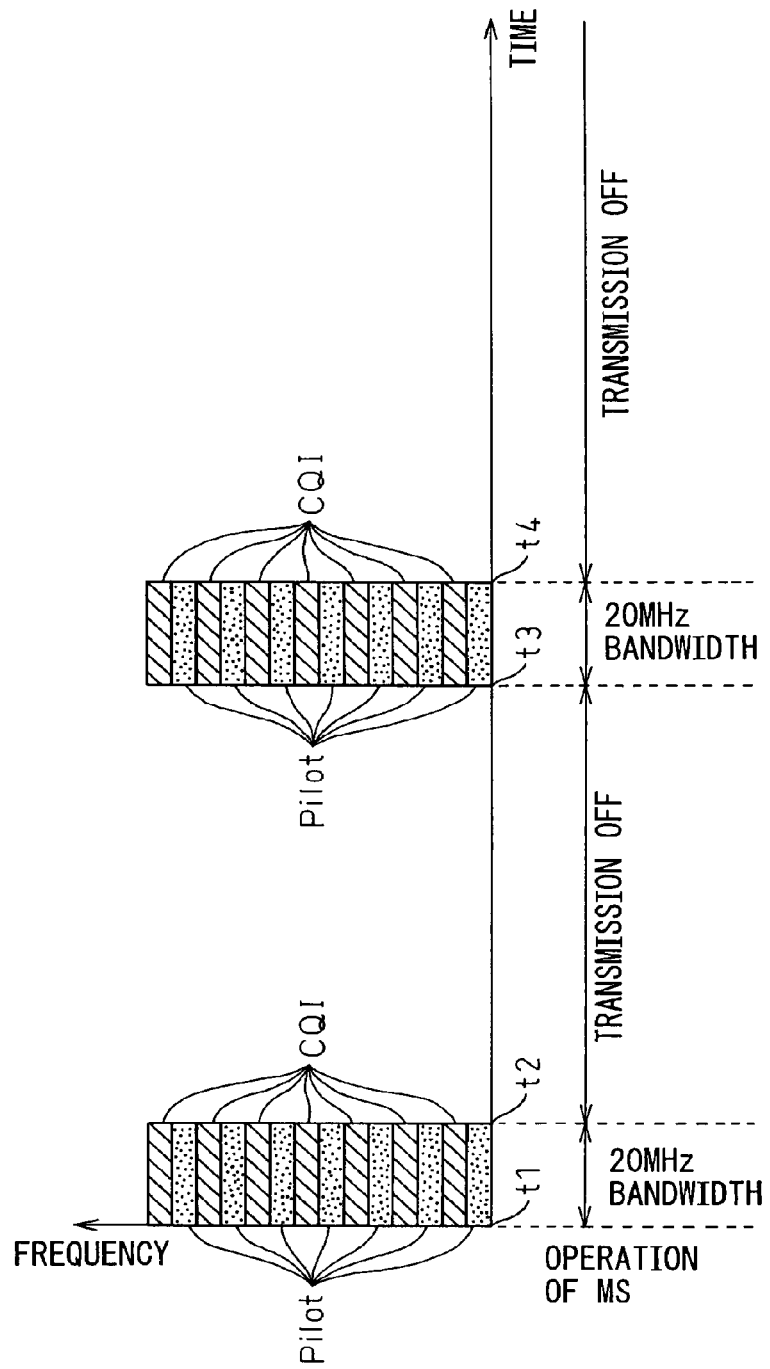
FIG. 12 is a time chart (part 2) showing how the downlink quality information and the uplink pilot signal are transmitted out in a distributed manner from the mobile user terminal of the present invention.

FIG. 12 is a time chart showing how the uplink pilot signal and the downlink quality information are transmitted out from the radio transmitting unit 212 shown in FIG. 10B. As shown, the uplink pilot signal is divided between multiple carrier frequencies and transmitted in parallel on the multiple carrier frequencies, and the downlink quality information also is divided between multiple carrier frequencies and transmitted in parallel on the multiple carrier frequencies. Here, the uplink pilot signal and the downlink quality information are transmitted at the same time. Further, the uplink pilot signal and the downlink quality information are transmitted using carriers of different frequencies.

In the transmission method of FIG. 12 also, the downlink quality information and the uplink pilot signal can be transmitted out in a distributed manner. In the distributed transmission method, the bandwidth of each carrier is narrow, but since the carriers are widely distributed, the frequency bandwidth that the entire signal uses is wide. As a result, when the downlink quality information and the uplink pilot signal are transmitted using different frequency bands, the difference between the transmission frequencies of these control signals may become substantial, increasing the processing complexity of the radio transmitting unit 212 as earlier described.

To prevent the difference between the carrier frequencies of the downlink quality information and the uplink pilot signal from becoming substantial, in the transmission method of FIG. 12 the inverse Fourier transform circuit 234 selects adjacent carrier frequencies from among the carrier frequencies assigned to the mobile user terminal (UE), and assigns the thus selected adjacent carrier frequencies for the transmission of the uplink pilot signal and the downlink quality information, thereby preventing their transmission frequencies from becoming substantially different from each other.

Figure 13:
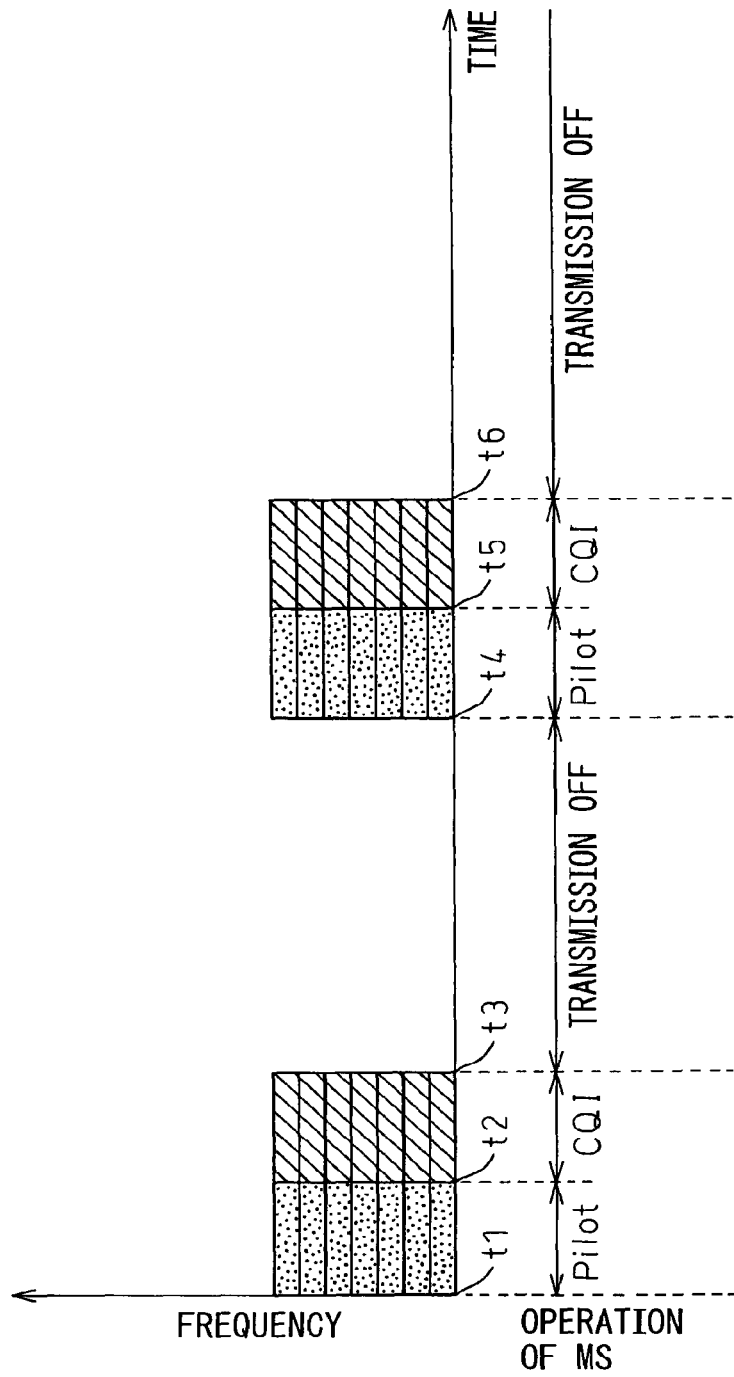
FIG. 13 is a time chart (part 1) showing how the downlink quality information and the uplink pilot signal are transmitted out in a localized manner from the mobile user terminal of the present invention.
Figure 14:
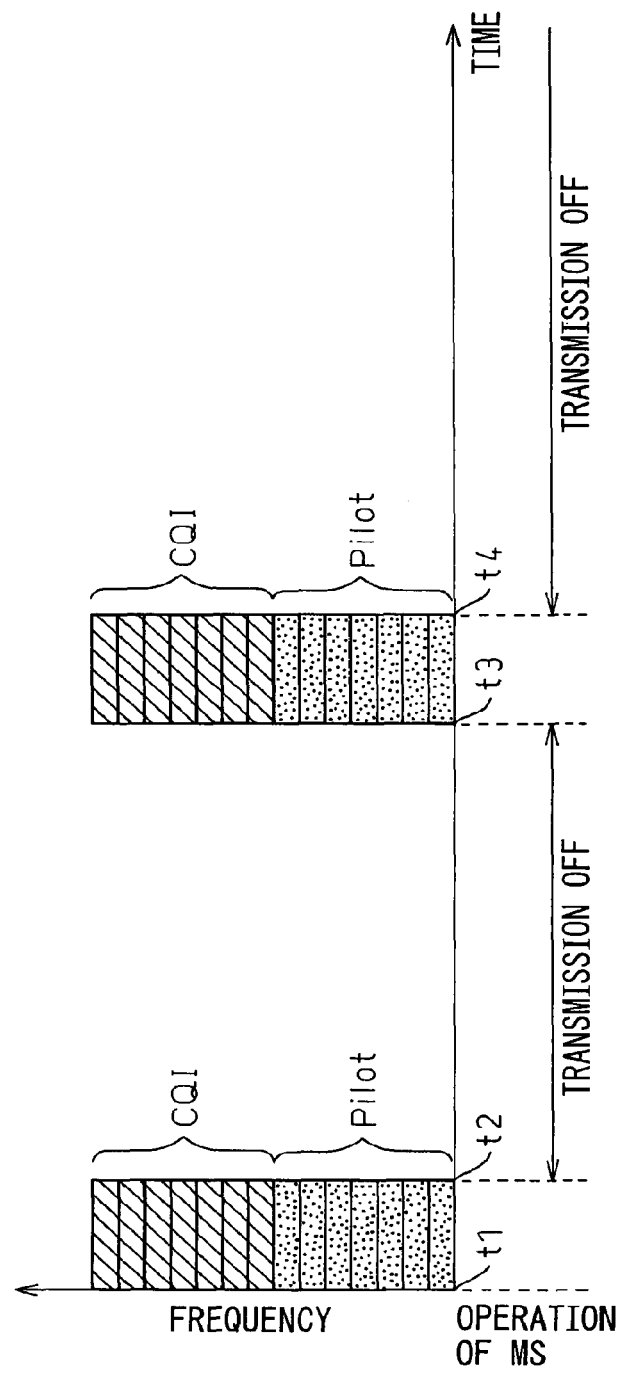
FIG. 14 is a time chart (part 2) showing how the downlink quality information and the uplink pilot signal are transmitted out in a localized manner from the mobile user terminal of the present invention.

The downlink quality information and the uplink pilot signal may be transmitted out in a so-called localized manner. The inverse Fourier transform circuit 234 may select, from among the plurality of carrier frequencies lying within the given frequency band assigned to the mobile user terminal (UE), some of the carrier frequencies clustered in a localized manner within the given frequency band and may assign the thus selected carrier frequencies for the transmission of the downlink quality information and the uplink pilot signal. FIGS. 13 and 14 are time charts each showing an example of how the downlink quality information and the uplink pilot signal are transmitted out in a localized manner.

In the example of FIG. 13, the uplink pilot signal is transmitted during time periods t1 to t2 and t4 to t5, and the downlink quality information during time periods t2 to t3 and t5 to t6, using some of the localized carrier frequencies selected from among the plurality of carrier frequencies lying within the given frequency band assigned to the mobile user terminal (UE). Here, the uplink pilot signal and the downlink quality information are transmitted using carriers of the same frequency and at the same intervals of time.

In the example of FIG. 14, the uplink pilot signal and the downlink quality information are transmitted at the same time by using some of the localized carrier frequencies selected from among the plurality of carrier frequencies lying within the given frequency band assigned to the mobile user terminal (UE) during time periods t1 to t2 and t3 to t4. Here, the carrier frequencies used for the transmission of the uplink pilot signal and the downlink quality information are adjacent to each other, as in the transmission method shown in FIG. 9.

Figure 15:
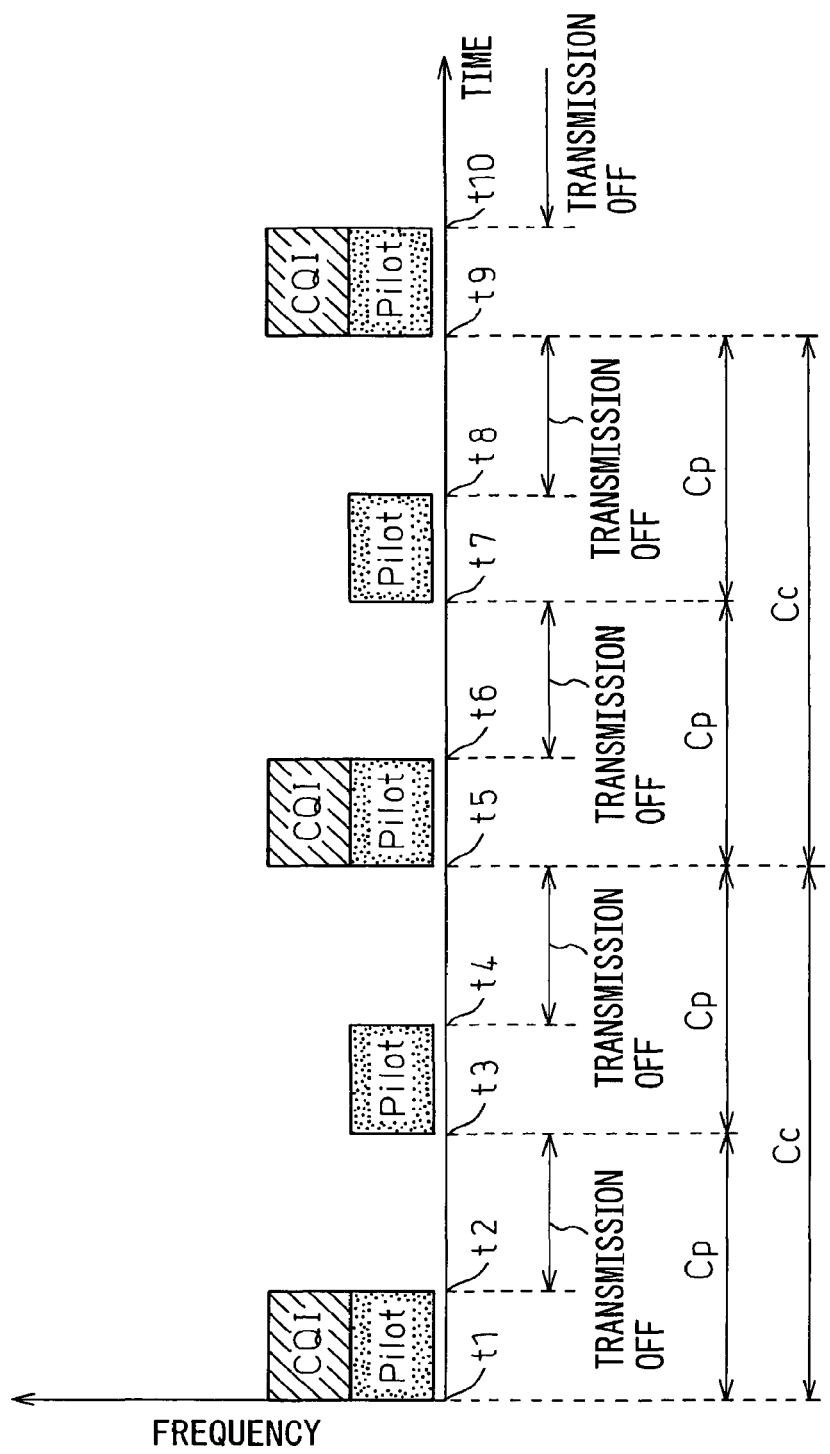
FIG. 15 is a time chart (part 1) showing how the downlink quality information and the uplink pilot signal are transmitted out when the amount of data to be transmitted differs between them.
Figure 16:
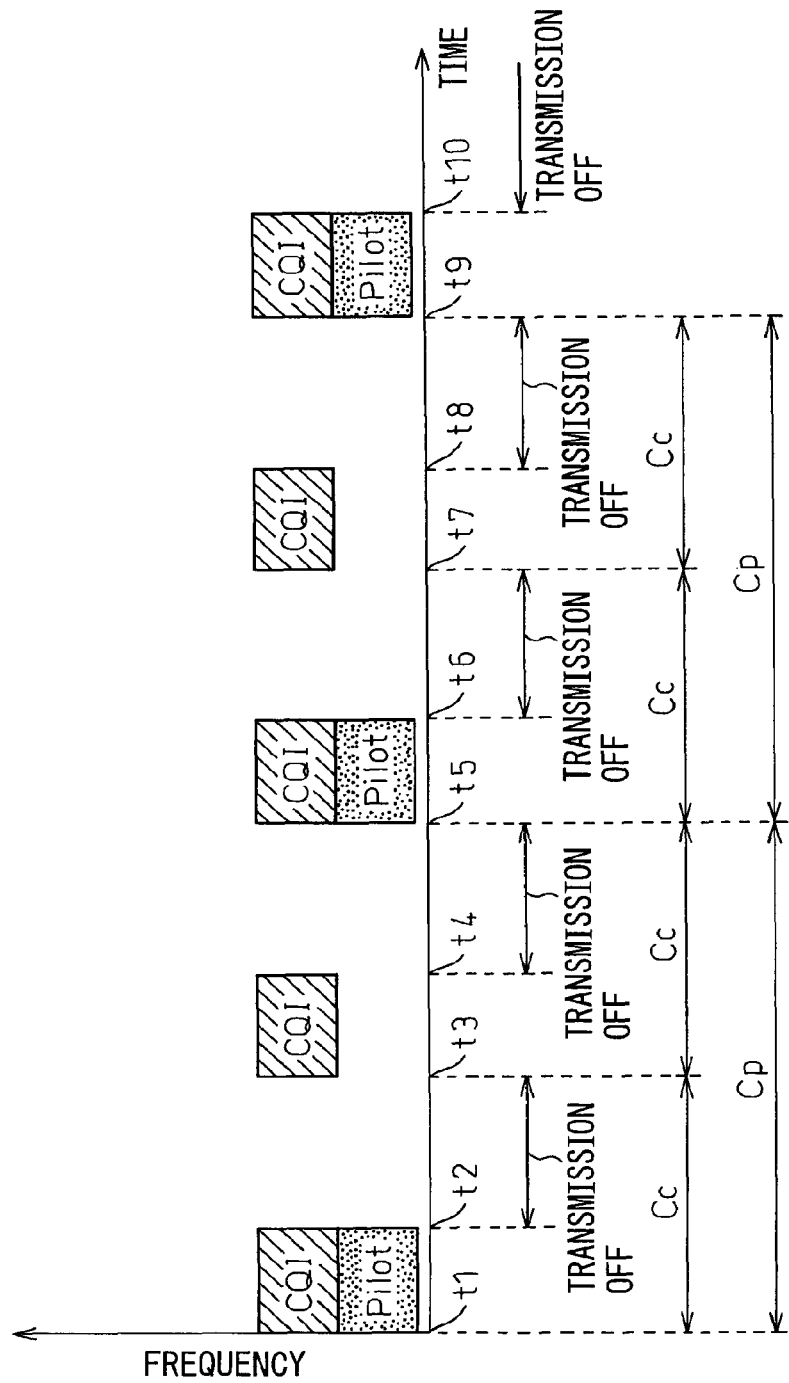
FIG. 16 is a time chart (part 2) showing how the downlink quality information and the uplink pilot signal are transmitted out when the amount of data to be transmitted differs between them.

The transmit time control unit 216 may set the transmission cycle of either one of the uplink pilot signal and the downlink quality information to an integral multiple of the transmission cycle of the other so that the respective control signals are transmitted out at different time intervals. For example, in the transmission method shown in FIG. 15, the transmission cycle of the uplink pilot signal is made to occur at twice the frequency of the transmission cycle of the downlink quality information, while in the transmission method shown in FIG. 16, the transmission cycle of the downlink quality information is made to occur at twice the frequency of the transmission cycle of the uplink pilot signal.

In this way, the amount of information to be transmitted within a given period, for example, can be made different between the uplink pilot signal and the downlink quality information, or the ratio between the frequency bands used for the transmission of the uplink pilot signal and the downlink quality information can be varied as desired.

Figure 17:
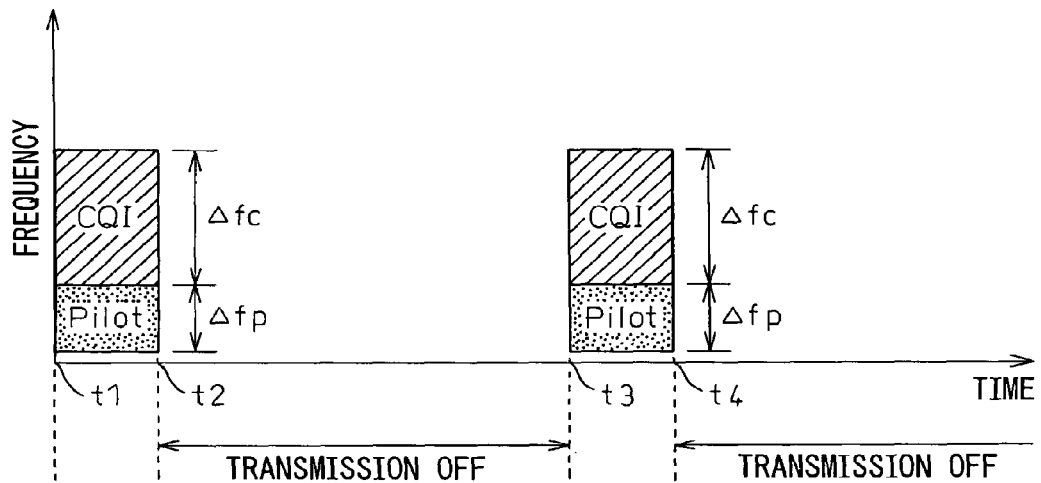
FIG. 17 is a time chart (part 3) showing how the downlink quality information and the uplink pilot signal are transmitted out when the amount of data to be transmitted differs between them.
Figure 18:
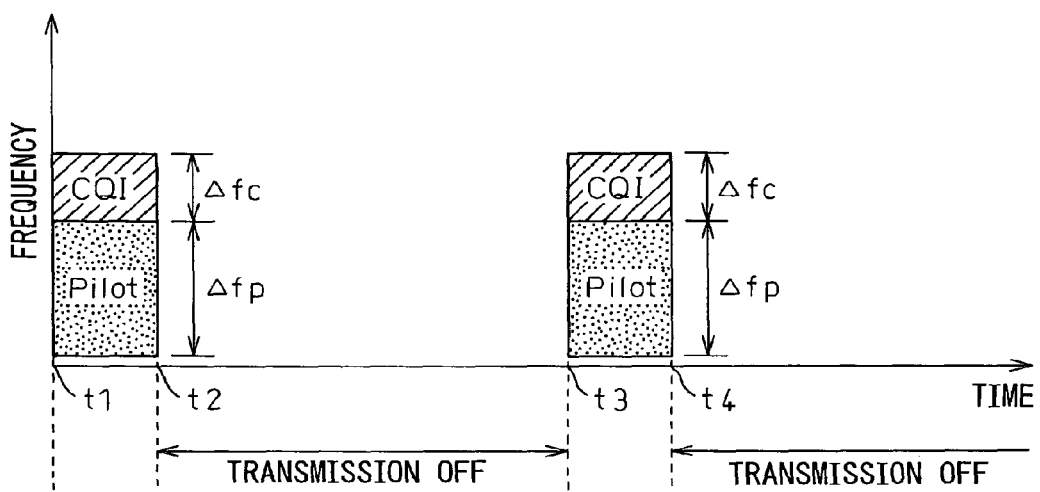
FIG. 18 is a time chart (part 4) showing how the downlink quality information and the uplink pilot signal are transmitted out when the amount of data to be transmitted differs between them.

The radio transmitting unit 212 may use different frequency bands for the transmission of the uplink pilot signal and the downlink quality information in order to make the amount of information to be transmitted within a given period different between the uplink pilot signal and the downlink quality information. In the transmission method shown in FIG. 17, frequency band Δfc which is larger than frequency band Δfp used for the transmission of the uplink pilot signal is used for the transmission of the downlink quality information, while in the transmission method shown in FIG. 18, frequency band Δfc which is smaller than frequency band Δfp used for the transmission of the uplink pilot signal is used for the transmission of the downlink quality information.

When the mobile user terminal (UE) transmits the downlink quality information and the uplink pilot signal at the same time or at times close to each other by using the same frequency or adjacent frequencies as described above, the radio receiving unit 112 in the base station BS shown in FIG. 4 can use the uplink pilot signal as a reference channel for channel estimation for the downlink quality information.

FIGS. 19A and 19B are diagrams each showing a configuration example of the radio receiving unit 112 in FIG. 4, as shown, the radio receiving unit 112 includes a channel estimating unit 136 which performs channel estimation for the downlink quality information by using the uplink pilot signal as a reference channel.

When the radio transmitting unit 212 in the mobile user terminal (UE) is, for example, an OFDM transmitter such as shown in FIG. 10A or 10B, the radio receiving unit 112 in the base station BS may be an OFDM receiver such as shown in FIG. 19A or 19B.

The radio receiving unit 112 comprises: a frequency conversion circuit 131, which converts the radio frequency signal received by the antenna 121 into an intermediate frequency signal; a quadrature detection circuit 132, which quadrature-detects the intermediate frequency signal; analog-digital conversion circuits 133 and 134, which converts the analog quadrature signals output from the quadrature detection circuit 132 into digital quadrature signals; a Fourier transform circuit (FFT) 135, which demodulates the downlink quality information and the uplink pilot signal from the digital quadrature signals; and parallel-serial conversion circuits 138 and 139, which convert the demodulated downlink quality information and uplink pilot signal into serial signals for output to the first and second control channel receiving units 113 and 114, respectively.

In the block diagrams of FIGS. 19A and 19B, only the portions necessary for receiving the uplink pilot signal and the downlink quality information are shown, however, the radio receiving unit 112 further includes component elements necessary for the reception of other control signals, packet data, and voice data.

The radio receiving unit 112 further comprises: the channel estimating unit 136, which uses the uplink pilot signal output from the Fourier transform circuit 135 as a reference channel and thereby outputs a correction signal for compensating for variations that occurred in the transmission path of the uplink pilot signal; and a multiplying circuit 137, which multiplies the downlink quality information output from the Fourier transform circuit 135 by the correction signal output from the channel estimating unit 136.

FIG. 19A shows the configuration of the radio receiving unit 112 for a case where the uplink pilot signal and the downlink quality information are transmitted using carriers of different frequencies. In this configuration, the uplink pilot signal and the downlink quality information are respectively output from different terminals of the Fourier transform circuit 135; the serial-parallel conversion circuit 138 is connected to the terminal at which the downlink quality information is output, and the serial-parallel conversion circuit 139 is connected to the terminal at which the uplink pilot signal is output. In this way, downlink quality information is supplied to the first upstream control channel receiving unit 113, and the uplink pilot signal is supplied to the second upstream control channel receiving unit 114.

FIG. 19B shows the configuration of the radio receiving unit 112 for a case where the uplink pilot signal and the downlink quality information are transmitted using carriers of the same frequency. In this configuration, the uplink pilot signal and the downlink quality information are output from the same terminal of the Fourier transform circuit 135. Therefore, the radio receiving unit 112 includes a switch 140, which operates to couple the output signal of the Fourier transform circuit 135 to the serial-parallel conversion circuit 138 during the reception of the downlink quality information and to the serial-parallel conversion circuit 139 during the reception of the uplink pilot signal.

The transmit time information generating unit 106 determines the receiving times for the uplink pilot signal and the downlink quality information in accordance with the transmit time information created for transmission to the mobile user terminal (UE). Then, a switching control signal is generated that causes the switch 140 to perform the above switching operation.

The switch 140 directs the output signal of the Fourier transform circuit 135 to the designated serial-parallel conversion circuit 138 or 139 in accordance with the switching control signal, thus supplying the downlink quality information to the first upstream control channel receiving unit 113 or the uplink pilot signal to the second upstream control channel receiving unit 114.

In accordance with the switching control signal output from the transmit time information generating unit 106, when the uplink pilot signal is received the channel estimating unit 136 uses the uplink pilot signal output from the Fourier transform circuit 135 as a reference channel and thereby generates the correction signal for compensating for variations that occurred in the transmission path of the uplink pilot signal. When the downlink quality information is received, the output signal of the Fourier transform circuit 135 is multiplied in the multiplying circuit 137 by the correction signal to correct the downlink quality information.

Figure 20:
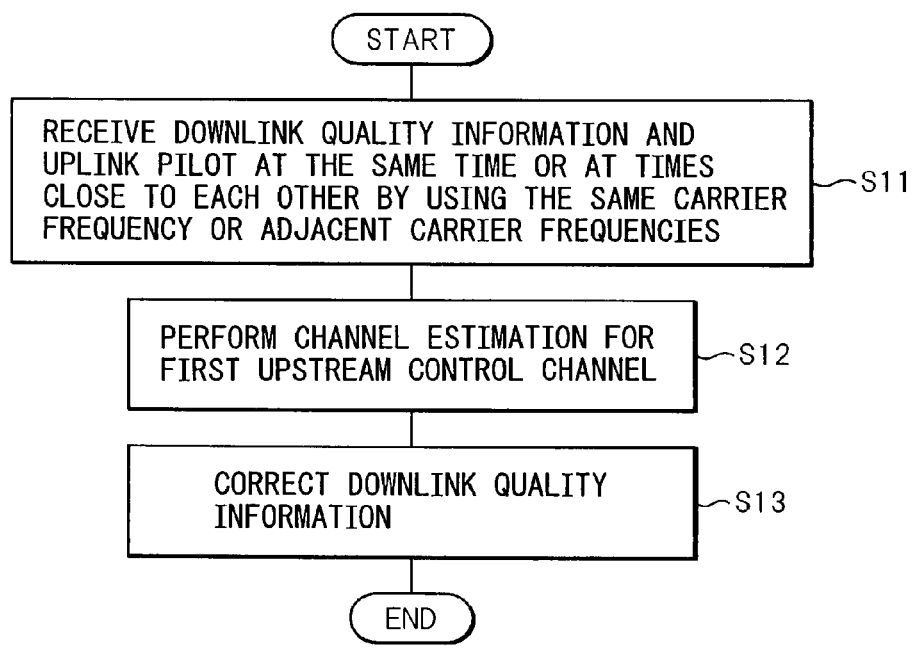
FIG. 20 is a flowchart showing the channel estimation operation for the downlink quality information performed in the base station shown in FIG. 4.

FIG. 20 is a flowchart showing the channel estimation operation for the downlink quality information performed by the base station BS.

In step S11, the radio receiving unit 112 receives the uplink pilot signal transmitted over the second upstream control channel from the mobile user terminal (UE), and at the same time, receives the downlink quality information transmitted over the first upstream control channel using a carrier frequency that is adjacent to the carrier frequency of the uplink pilot signal. Alternatively, the radio receiving unit 112 receives the uplink pilot signal transmitted over the second upstream control channel from the mobile user terminal (UE), and at a time close to the receipt time, receives the downlink quality information transmitted over the first upstream control channel using a carrier frequency that is the same as or adjacent to the carrier frequency of the uplink pilot signal.

In step S12, the channel estimating unit 136 performs channel estimation for the first upstream control channel by using the uplink pilot signal output from the Fourier transform circuit 135 as a reference channel, and generates a correction signal for the downlink quality information.

In step S13, the channel estimating unit 136 corrects the downlink quality information output from the Fourier transform circuit 135, by multiplying the downlink quality information with the correction signal by using the multiplying circuit 137.

According to the present invention, since the downlink quality information and the uplink pilot signal can be transmitted at the same time or in successive time periods, the number of times that power is turned on to the amplifier circuit provided in the output stage of the transmitter circuit of the mobile user terminal decreases, and consequently, the length of time that the amplifier circuit has to be energized before the transmission of the signal is reduced, thus reducing the power consumption.

Furthermore, since the downlink quality information and the uplink pilot signal can be transmitted using the same carrier frequency or carrier frequencies close to each other, it is possible to reduce the amount of bias control to be applied to the amplifier circuit provided in the output stage of the transmitter circuit of the mobile user terminal, and thus the processing complexity of the transmitter circuit can be prevented from increasing.

The present invention can be applied widely to a mobile user terminal, a mobile communication system, and a base station wherein downlink quality information and an uplink pilot signal are transmitted from the mobile user terminal to the base station. In particular, the invention can be applied advantageously to a mobile user terminal, a mobile communication system, and a base station that employs the 3.9-generation mobile communication architecture for which standardizing is currently underway.

While the invention has been described with reference to specific embodiments chosen for purpose of illustration, it should be apparent that numerous modifications could be made thereto by those skilled in the art without departing from the basic concept and scope of the invention.

The invention claimed is:

1. A mobile user terminal comprising:
a receiver which receives a signal; and
a processor which measures downlink channel quality based on the signal and does not transmit downlink channel quality information and an uplink pilot signal simultaneously at a period which the mobile user terminal is a state of transmission off in an intermittent fashion.

* * * * *